United States Patent
Maretti et al.

(10) Patent No.: US 11,904,511 B2
(45) Date of Patent: Feb. 20, 2024

(54) MOULD FOR THE PRODUCTION OF CLOSURES IN COMPRESSION MOULDING MACHINES

(71) Applicant: SACMI COOPERATIVA MECCANICI IMOLA SOCIETA' COOPERATIVA, Imola (IT)

(72) Inventors: Piero Maretti, Faenza (IT); Davide Penazzi, Imola (IT)

(73) Assignee: SOCIETA COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 16 days.

(21) Appl. No.: 17/754,236

(22) PCT Filed: Oct. 1, 2020

(86) PCT No.: PCT/IB2020/059208
§ 371 (c)(1),
(2) Date: Mar. 28, 2022

(87) PCT Pub. No.: WO2021/064631
PCT Pub. Date: Apr. 8, 2021

(65) Prior Publication Data
US 2022/0410444 A1 Dec. 29, 2022

(30) Foreign Application Priority Data
Oct. 3, 2019 (IT) .................. 102019000017849

(51) Int. Cl.
*B29C 43/36* (2006.01)
*B29C 43/08* (2006.01)
(Continued)

(52) U.S. Cl.
CPC ............ *B29C 43/361* (2013.01); *B29C 43/08* (2013.01); *B29C 43/50* (2013.01); *B29C 43/52* (2013.01);
(Continued)

(58) Field of Classification Search
None
See application file for complete search history.

(56) References Cited

U.S. PATENT DOCUMENTS

| 3,337,920 A | 8/1967 | Jagger et al. |
| 4,640,673 A | 2/1987 | Hiroshi et al. |

(Continued)

FOREIGN PATENT DOCUMENTS

| CN | 101208186 A | 6/2008 |
| CN | 101208186 B | 4/2013 |

(Continued)

OTHER PUBLICATIONS

Indian First Examination Report—from Indian Application 202217019531, dated Jul. 21, 2022, includes machine English translation, 8 pages.

(Continued)

*Primary Examiner* — Robert J Grun
(74) *Attorney, Agent, or Firm* — Pearne & Gordon LLP; Bryan M. Gallo

(57) ABSTRACT

A mould for the production of closures with tear-off membrane in a compression moulding machine, comprises: a male die element including a first abutment surface and a female die element movable relative to each other along a moulding orientation. The mould is positionable between a closed configuration, in which the male die element and the female die element are in contact with each other, and an open configuration, in which the male die element and the female die element are spaced apart. The female die element (Continued)

includes: a first block, a second block and a third block, aligned with each other and movable along the moulding orientation; a first spring, interposed between the first block and the second block; a second spring, interposed between the second block and the third block and configured to apply an opening force along the moulding orientation. The first spring is configured to apply a closing force along the moulding orientation to keep the second block and the first block in contact with each other when no other forces are applied.

8 Claims, 12 Drawing Sheets

(51) Int. Cl.
  *B29C 43/50* (2006.01)
  *B29C 43/52* (2006.01)
  *B29C 43/58* (2006.01)
  *B29L 31/56* (2006.01)
(52) U.S. Cl.
  CPC ...... *B29C 43/58* (2013.01); *B29C 2043/3676* (2013.01); *B29C 2043/5053* (2013.01); *B29L 2031/565* (2013.01)

(56) References Cited

U.S. PATENT DOCUMENTS

| | | |
|---|---|---|
| 4,755,125 A | 7/1988 | Hiroshi et al. |
| 8,431,069 B2 | 4/2013 | Dordoni et al. |
| 10,682,790 B2 | 6/2020 | Bergami et al. |
| 2009/0108495 A1 | 4/2009 | Takeuchi et al. |
| 2010/0028475 A1 | 2/2010 | Takeuchi et al. |

FOREIGN PATENT DOCUMENTS

| | | |
|---|---|---|
| CN | 106738559 | 5/2017 |
| EP | 0162456 A2 | 11/1985 |
| RU | 2011124253 A | 12/2012 |
| RU | 2693763 C2 | 12/2018 |
| RU | 2703160 C2 | 10/2019 |

OTHER PUBLICATIONS

Russian OA and English translation of Russian OA—from Russian Application No. 2022110405/04(021995)—dated Nov. 2, 2022, 7 pages.
Russian Search Report—from Russian Application No. 2022110405/04(021995)—completed Nov. 2, 2022, 2 pages.

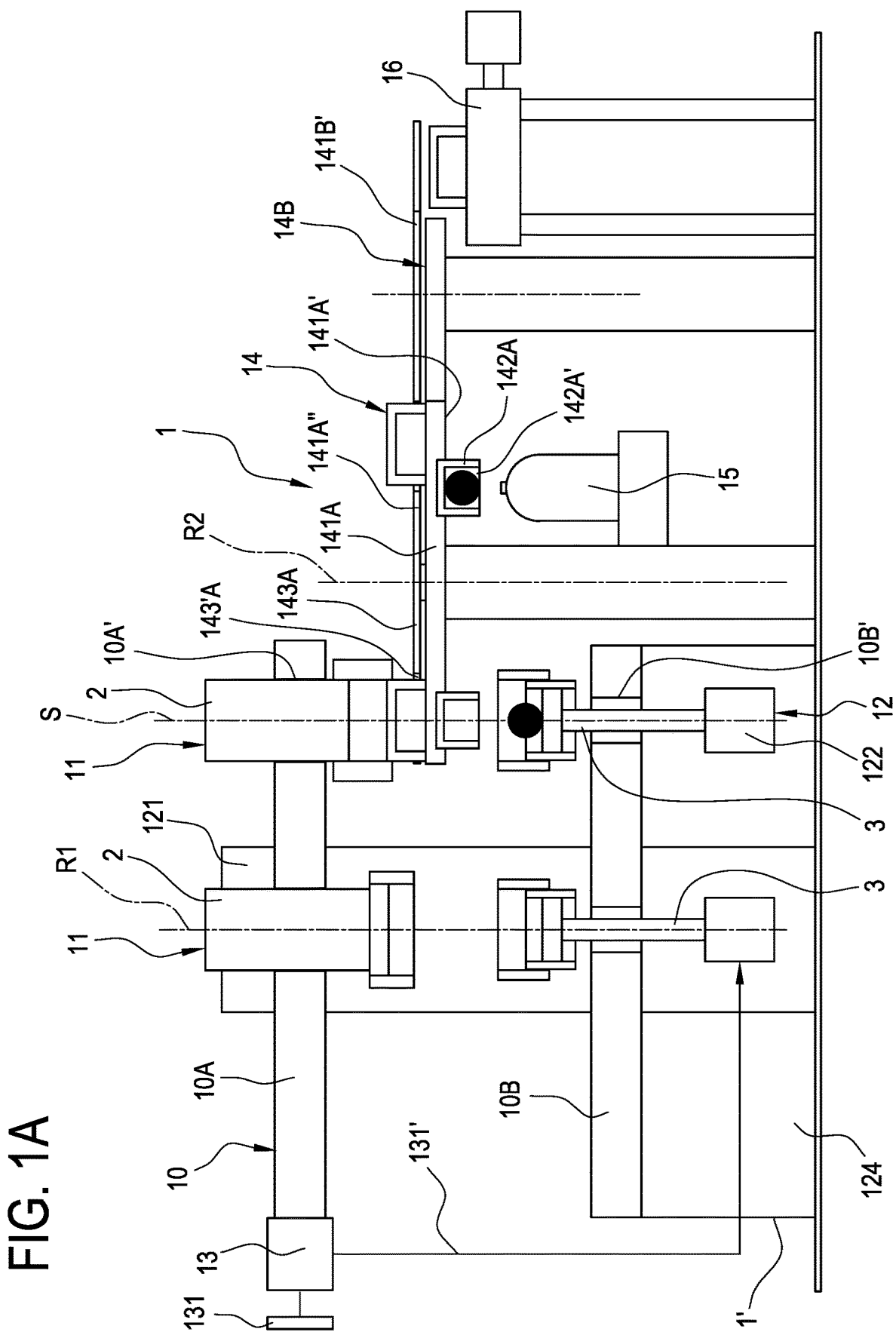

MOULD FOR THE PRODUCTION OF CLOSURES IN COMPRESSION MOULDING MACHINES

TECHNICAL FIELD

This invention relates to a mould, a machine and a method for the compression moulding of plastic closures.

Compression moulding machines comprise a rotary carousel which houses a plurality of compression stations, each disposed at a respective angular coordinate of the carousel and configured to perform a respective work cycle in one full turn of the carousel.

Each compression station comprises a mould, including a male die element (generally called "male") and a female die element (generally called "female"). In a compression moulding machine, a charge of plastic material is first of all placed in the female die element. Next, the female die element slides relative to the male die element, coming into abutment against it in an abutment zone, to define a cavity in which the plastic charge is pressed so it spreads and conforms to the shape of the cavity to form the closure.

This said, it should be noted that this disclosure relates to a specific type of closure, used on bottles containing oil. These closures comprise a membrane to preserve the quality of the oil until the moment it is used and a tab connected to the membrane to allow the membrane to be removed. The oil container can be opened by pulling the tab to tear off the membrane so that the oil can be poured out of the container

BACKGROUND ART

Prior art solutions for making closures of this kind are described, for example, in document CN106738559A, where the female die element (or "female") is divided into blocks that are slidable relative to each other.

These solutions do not, however, solve some of the drawbacks due to the nature of the closure being made. One of the drawbacks that has not been completely overcome is that the plastic charge may not be spread uniformly. In effect, the limited thickness of the membrane, corresponding to a very thin gap, makes it difficult for the plastic to flow through the passage afforded by the gap. In addition, the presence of the tab makes the common operations needed to extract the closure from the machine more difficult, resulting, for example, in the membrane being detached in advance.

DISCLOSURE OF THE INVENTION

This invention has for an aim to provide a mould, a machine and a method for the compression moulding of closures to overcome the above mentioned drawbacks of the prior art.

This aim is fully achieved by the mould, the machine and the method of this disclosure as characterized in the appended claims.

The mould according to this invention comprises a male die element and a female die element which move relative to each other to define an expansion chamber in which a charge of material is compressed into a predetermined shape. In this disclosure, the closure made by the mould is a closure with a tear-off membrane. Closures with tear-off membrane have two specific, additional features compared to standard closures: the presence of a very thin membrane and the presence of a tab used to tear the membrane off to allow the fluid to be poured out of the container on which the closure is applied.

Since both the membrane and the tab have very narrow cross sections, the resistance to the migration of the charge of material during compression is high and may translate as non-uniform spreading of the charge in the expansion chamber.

Moreover, the connecting point between the collar of the closure and the membrane must be very thin to allow the membrane to be torn off easily.

Advantageously, this disclosure provides a mould in which the female die element comprises a first block, a second block and a third block, which are movable relative to each other along a moulding orientation. The mobility between the modules allows obtaining sequential closing and opening of the mould.

The technical effect of this feature is that of defining the expansion chamber progressively, so that the compression process can start before the expansion chamber is completely defined. This step of compressing, which occurs before the expansion chamber is completely defined, enables the charge to reach even the outermost spaces (that is, the collar of the closure). To allow sequentially closing the first, second and third blocks, the mould of this disclosure comprises a first spring and/or a second spring.

The first spring is configured to keep the first block and the second block spaced apart during opening and during closing. The second spring is configured to keep the second block and the third block spaced apart during opening and during closing.

A machine for making closures is characterized by the possibility of changing the moulds as a function of the type of closure to be made. A machine can therefore be fitted with different moulds. The compression moulding machine may, for example, be a rotary machine. In such a case, the machine has a first platen, which holds the male part of the mould, and a second platen, which holds the female part of the mould. The distance between the first platen and the second platen is called "gape" and, in many cases, is not variable.

Conventional moulds have a maximum extension along the moulding orientation that is smaller than that of the mould of this disclosure because they comprise single blocks that are more compact.

It is therefore necessary to reduce the extension of the mould to enable it to be fitted also on a machine originally designed for conventional moulds.

In this regard, this disclosure provides a variant of the first spring which is configured to keep the first and the second block in contact with each other during closure but allows the first and the second block to be spaced apart during opening so as to facilitate releasing of the tab.

This disclosure also affords an advantageous solution for cooling the male and female mould parts. More specifically, each block comprises a respective internal circuit with a refrigerant fluid flowing inside it. In an embodiment, these internal circuits may be mounted in series or in parallel. The operating conditions of the mould may change, however, and in a given configuration in series or in parallel, the cooling efficiency may not be adequate for one block or another. In this regard, this disclosure provides a reconfiguring device configured to vary a connecting configuration of the internal circuits of the first, second and third blocks between a configuration in series, in which the internal circuits of the first, second and third blocks are connected in series, and a configuration in parallel, in which the internal circuits of the first, second and third blocks are connected in parallel.

In an embodiment, this disclosure also provides a system for aiding closure release. In effect, with closures of this kind, the step of releasing is quite critical with regard to both the female and the male, which has to release more closure parts whose detachment is critical. To facilitate detachment, this disclosure provides a pressurizing duct which blows a jet of air through the tip of the male facing the female. This air jet produces a force that pushes the surface of the closure away from the male so that the closure can be withdrawn by an auxiliary unit.

BRIEF DESCRIPTION OF DRAWINGS

These and other features will become more apparent from the following detailed description of a preferred embodiment, illustrated by way of non-limiting example in the accompanying drawings, in which:

FIG. 1A schematically illustrates an embodiment of the machine of FIG. 1;

DETAILED DESCRIPTION OF PREFERRED EMBODIMENTS OF THE INVENTION

Figure 1:
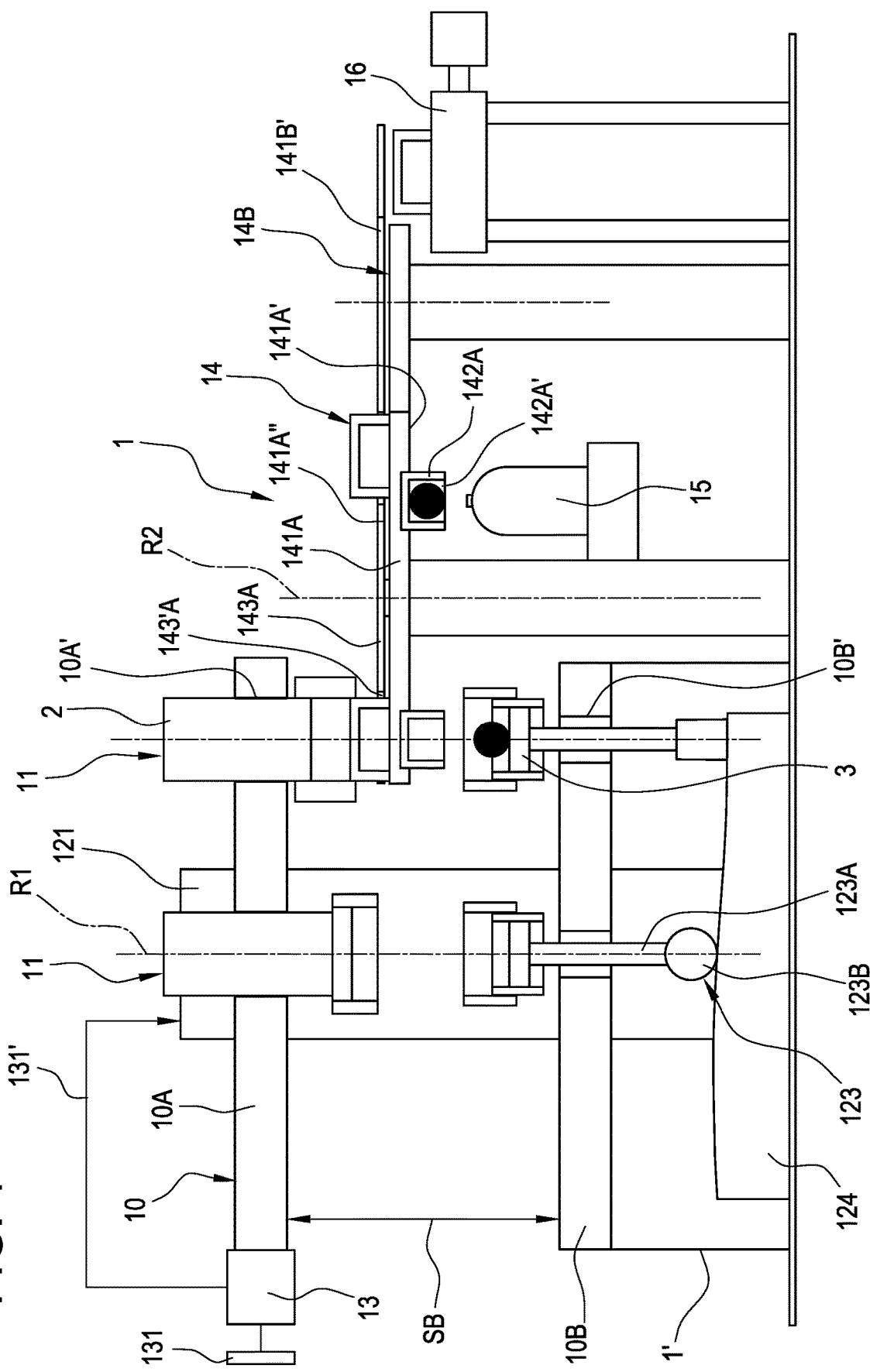
FIG. 1 schematically illustrates a compression moulding machine for making closures with tear-off membrane.
Figure 2:
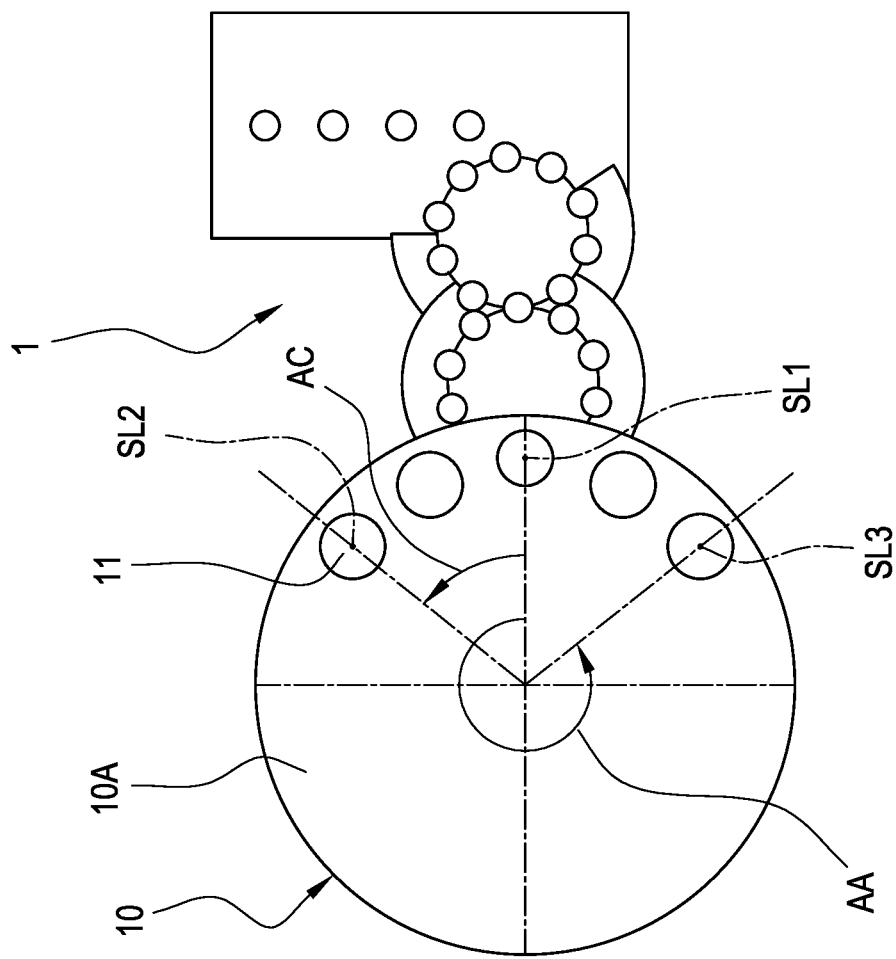
FIG. 2 is a schematic top view of the machine of FIG. 1.
Figure 3:
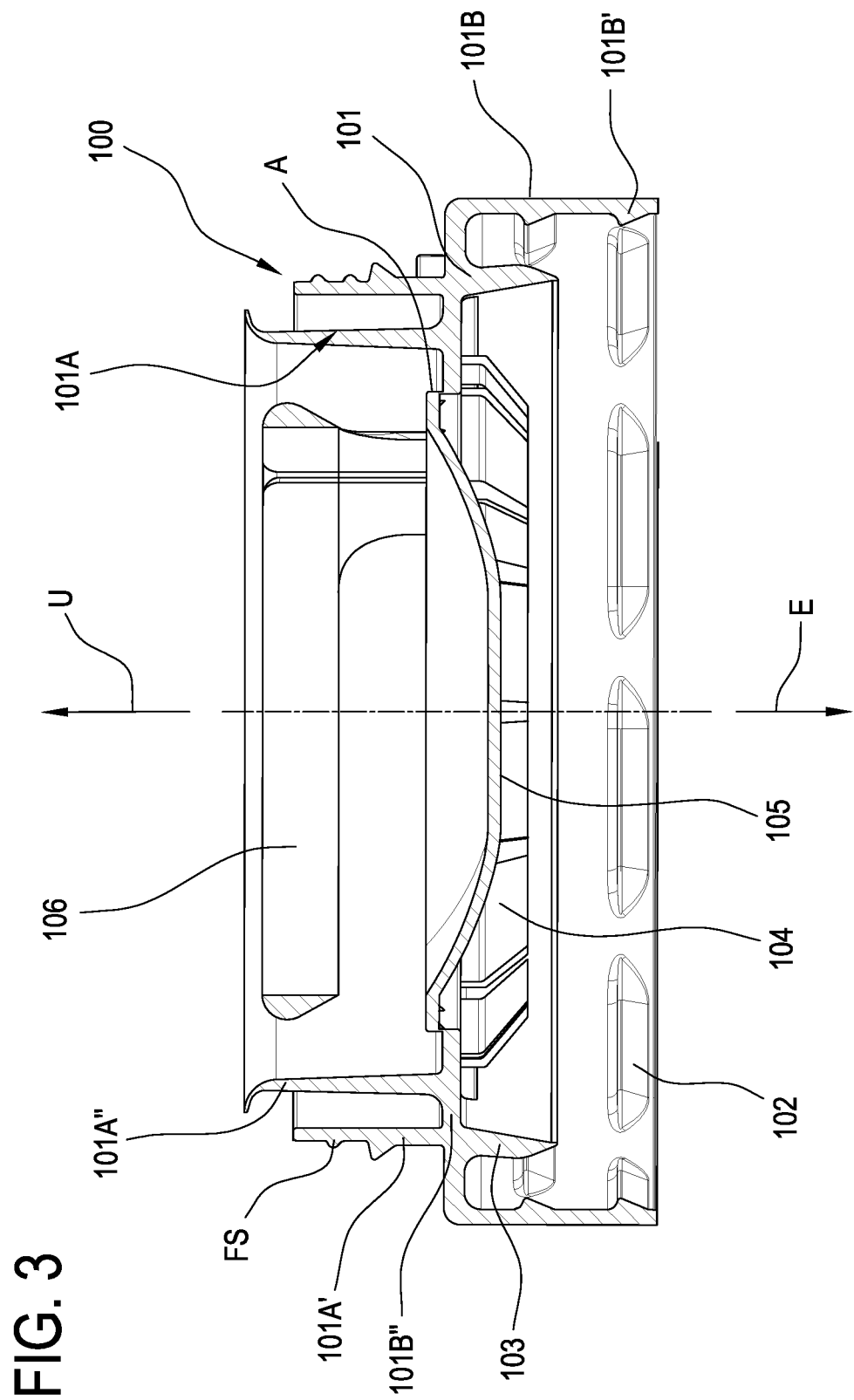
FIG. 3 illustrates an embodiment of a closure with a tear-off membrane.
Figure 4:
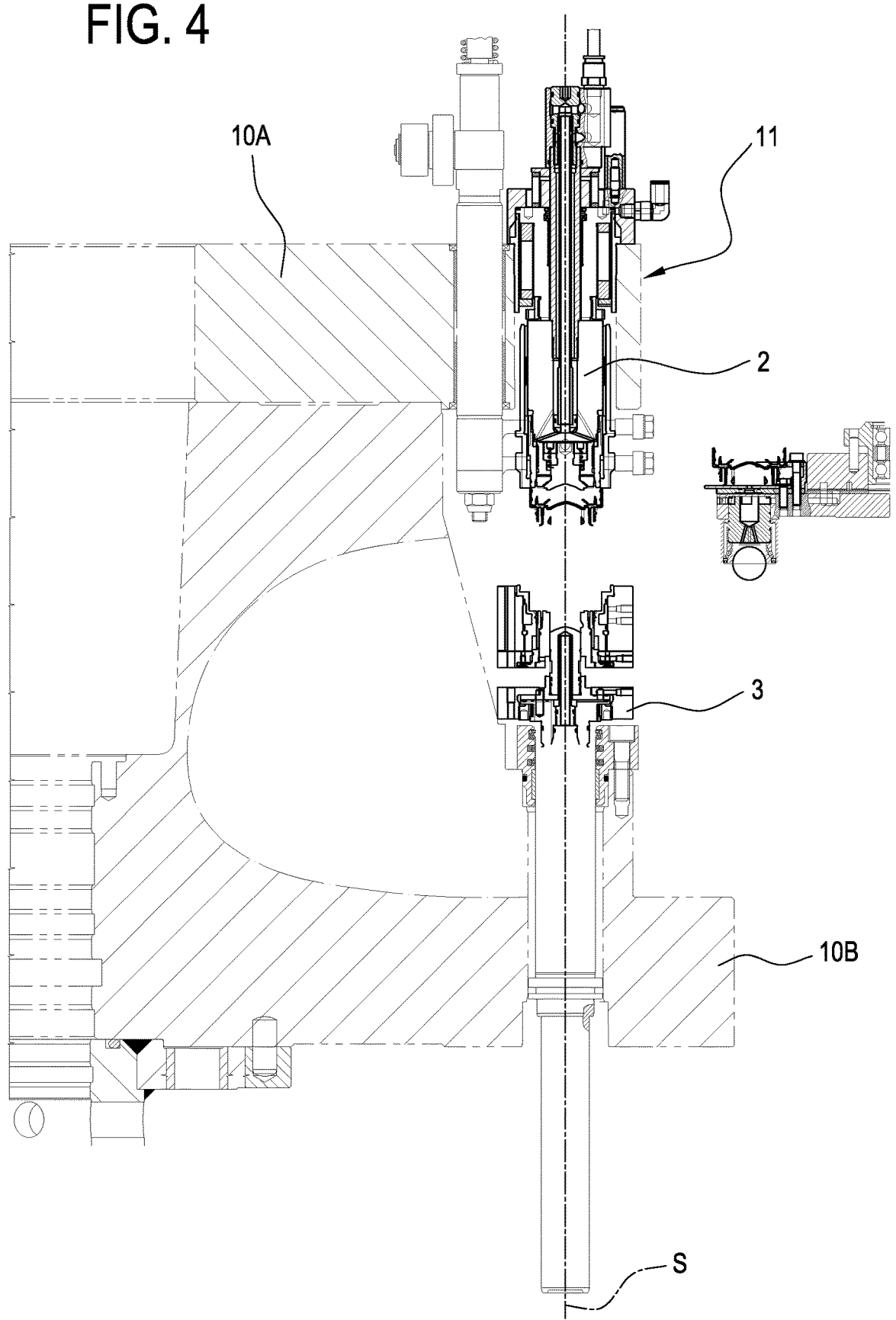
FIG. 4 shows a cross section of a mould for making a closure with a tear-off membrane.
Figure 5:
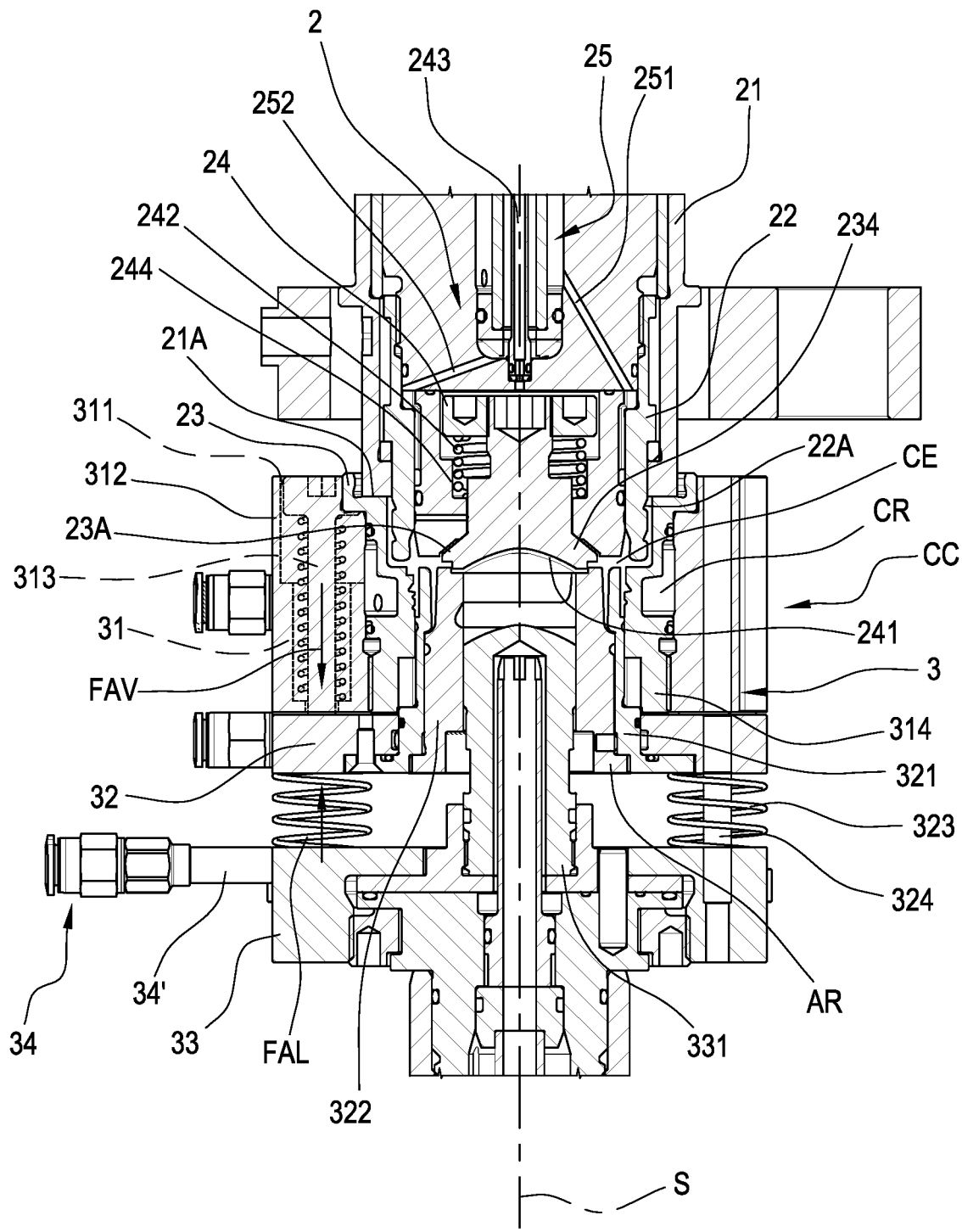
FIG. 5 shows a detail of the cross section of FIG. 4 with the mould in a different operating configuration.
Figure 6A:
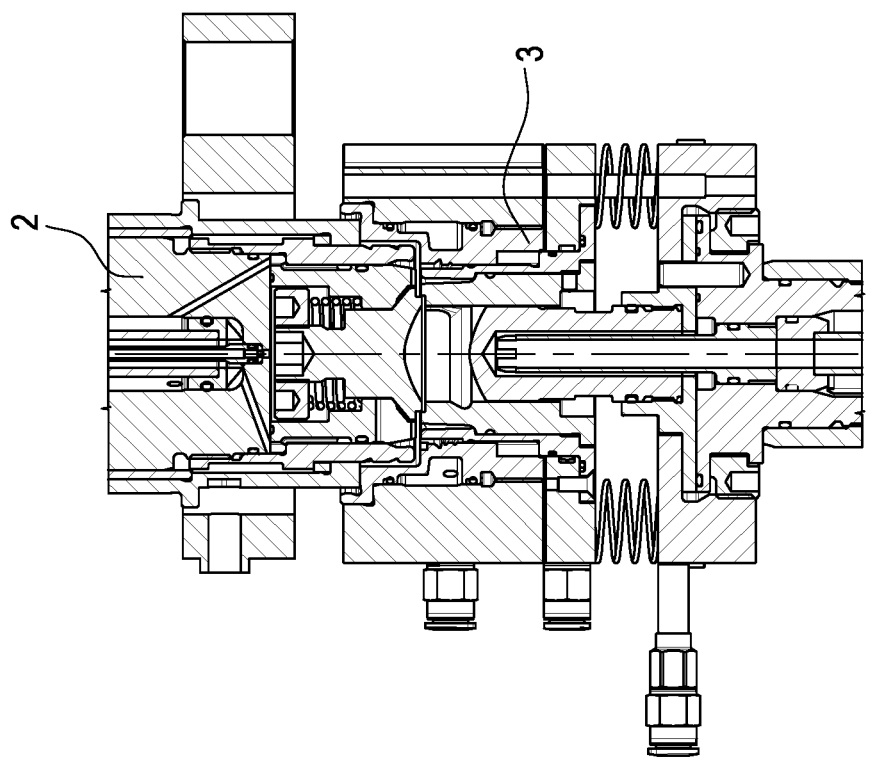
FIGS. 6A, 6B, 6C, 6D, 6E, 6F, 6G illustrate the detail of FIG. 4 with the mould in respective operating configurations.
Figure 6B:
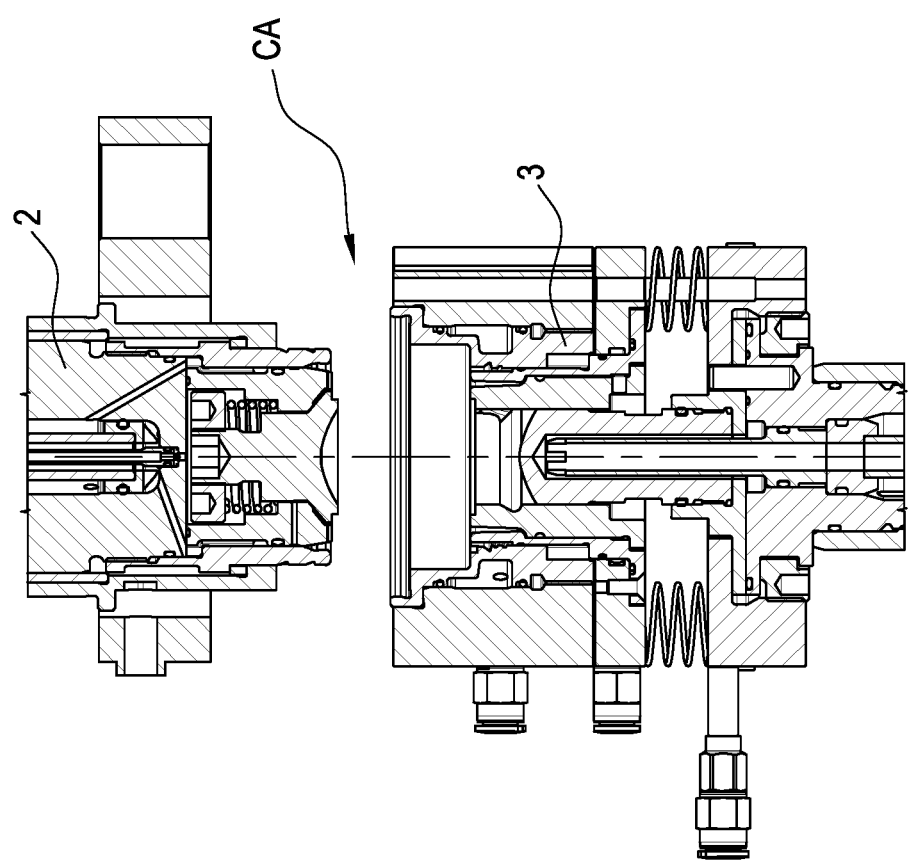
Figure 6D:
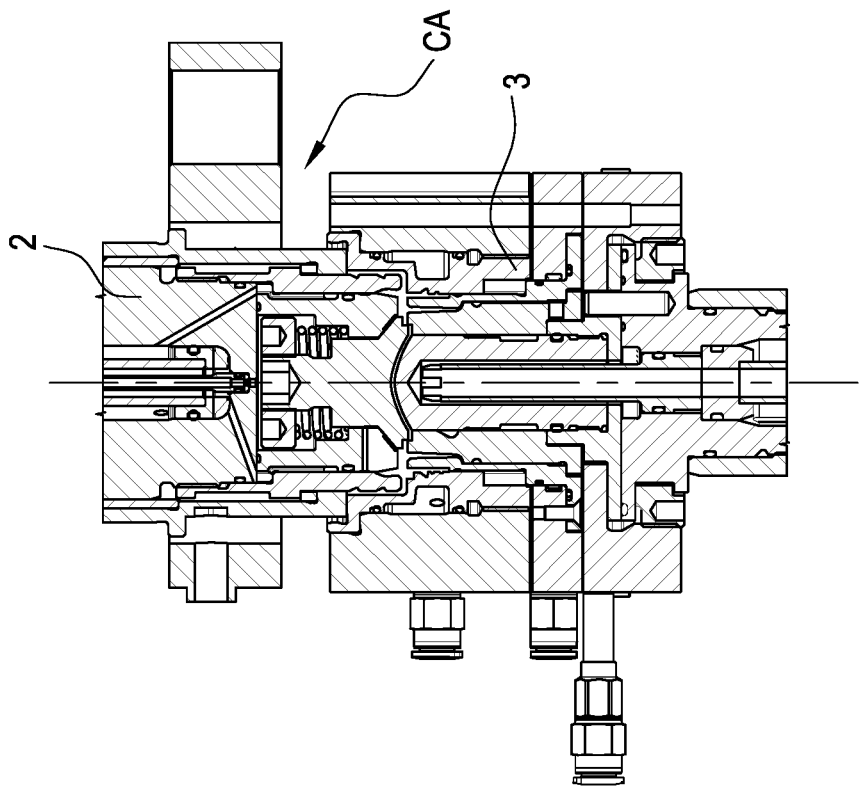
Figure 6C:
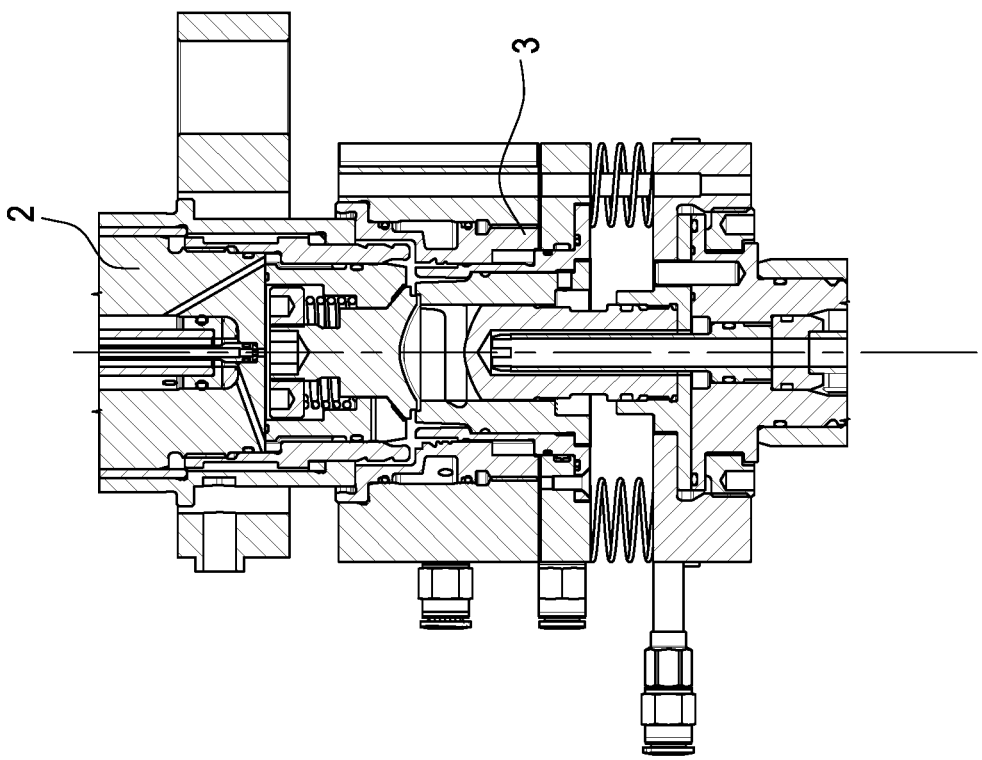
Figure 6E:
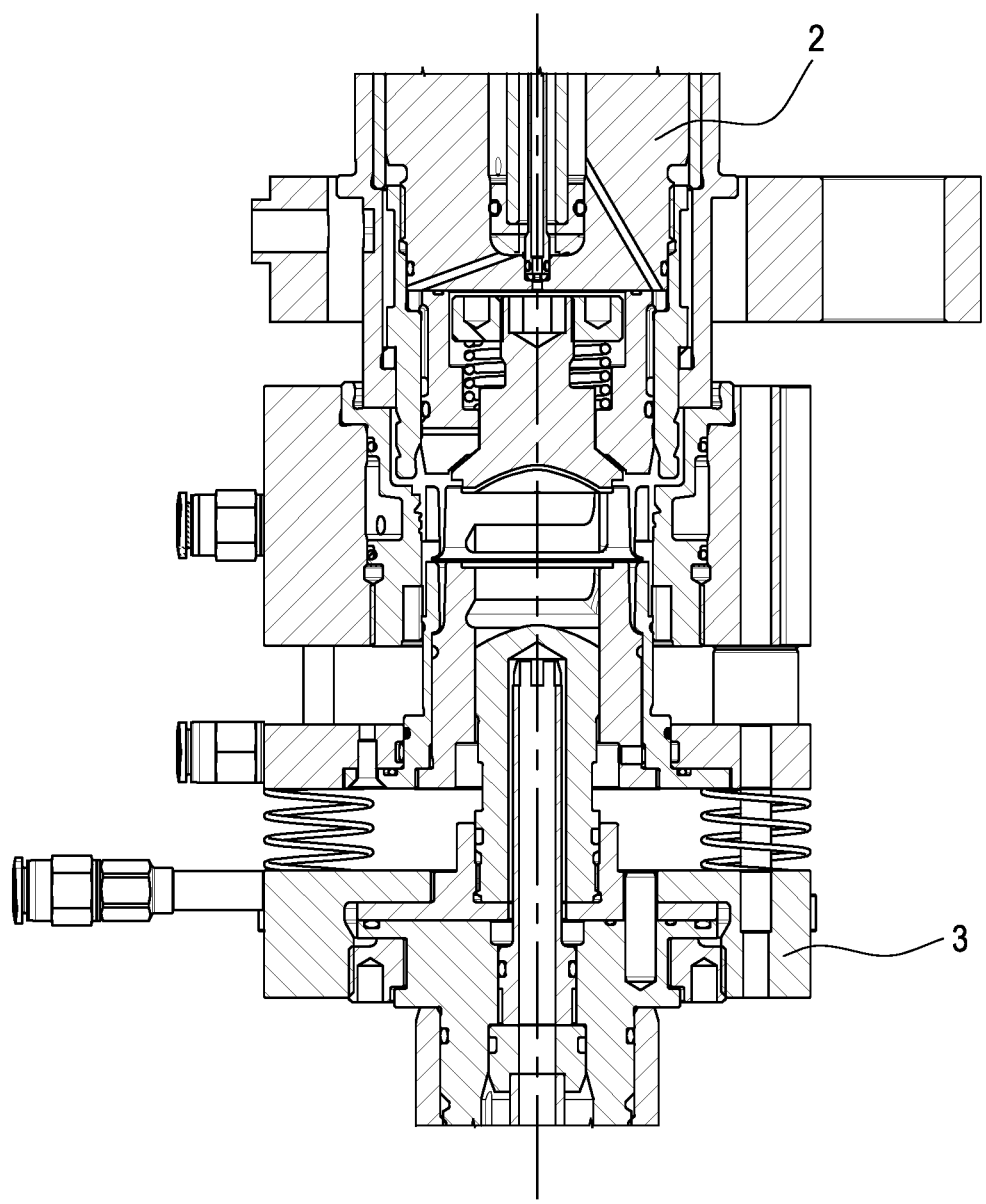
Figure 6G:
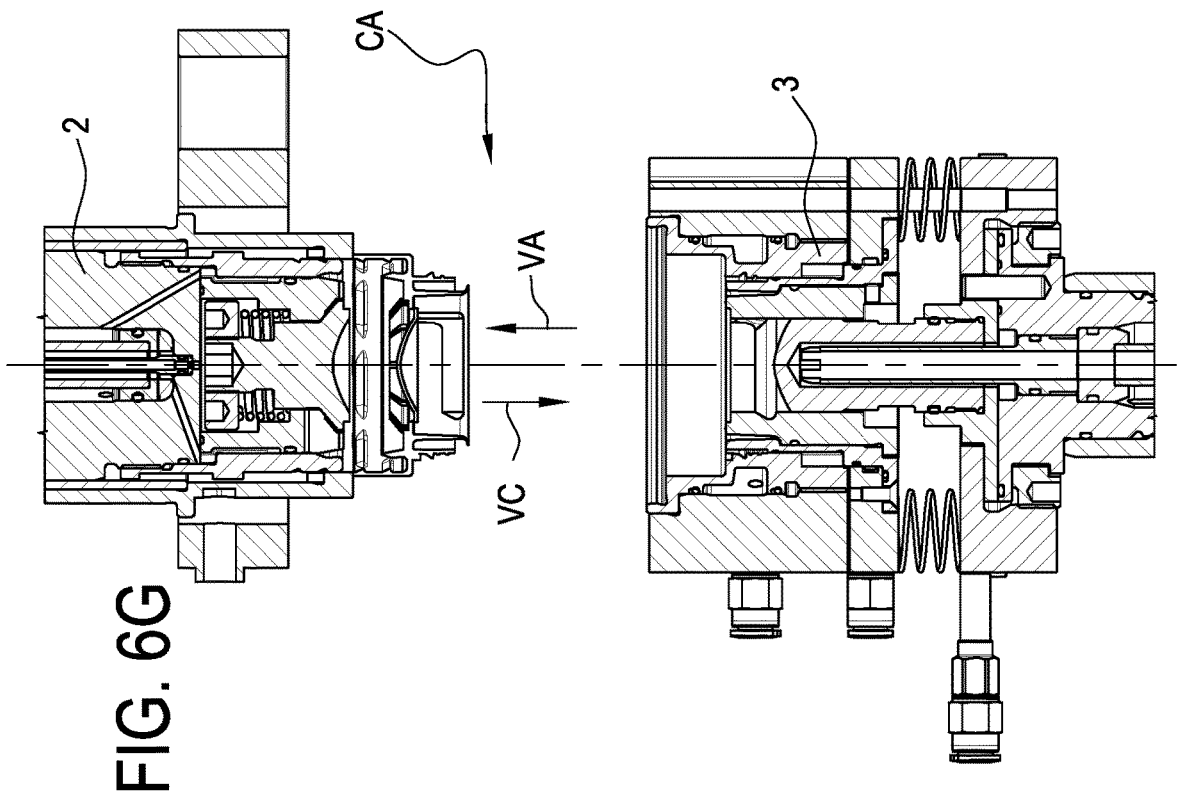
Figure 6F:
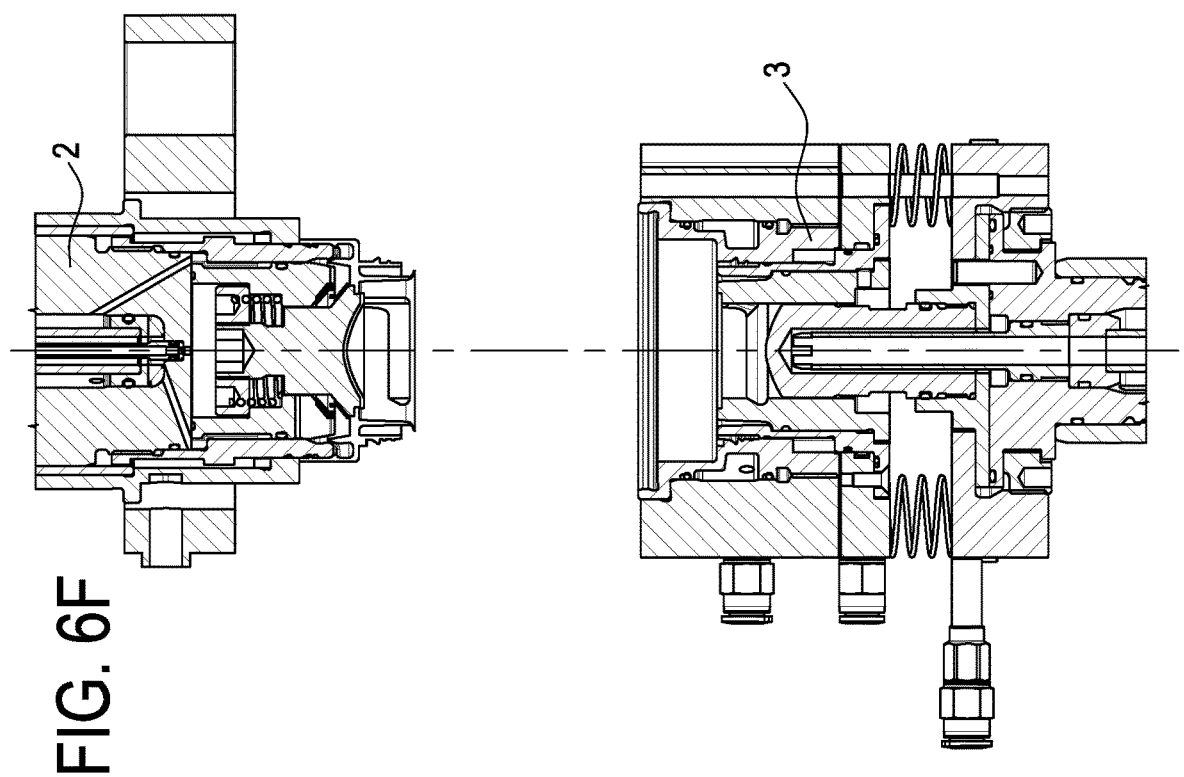
Figure 7A:
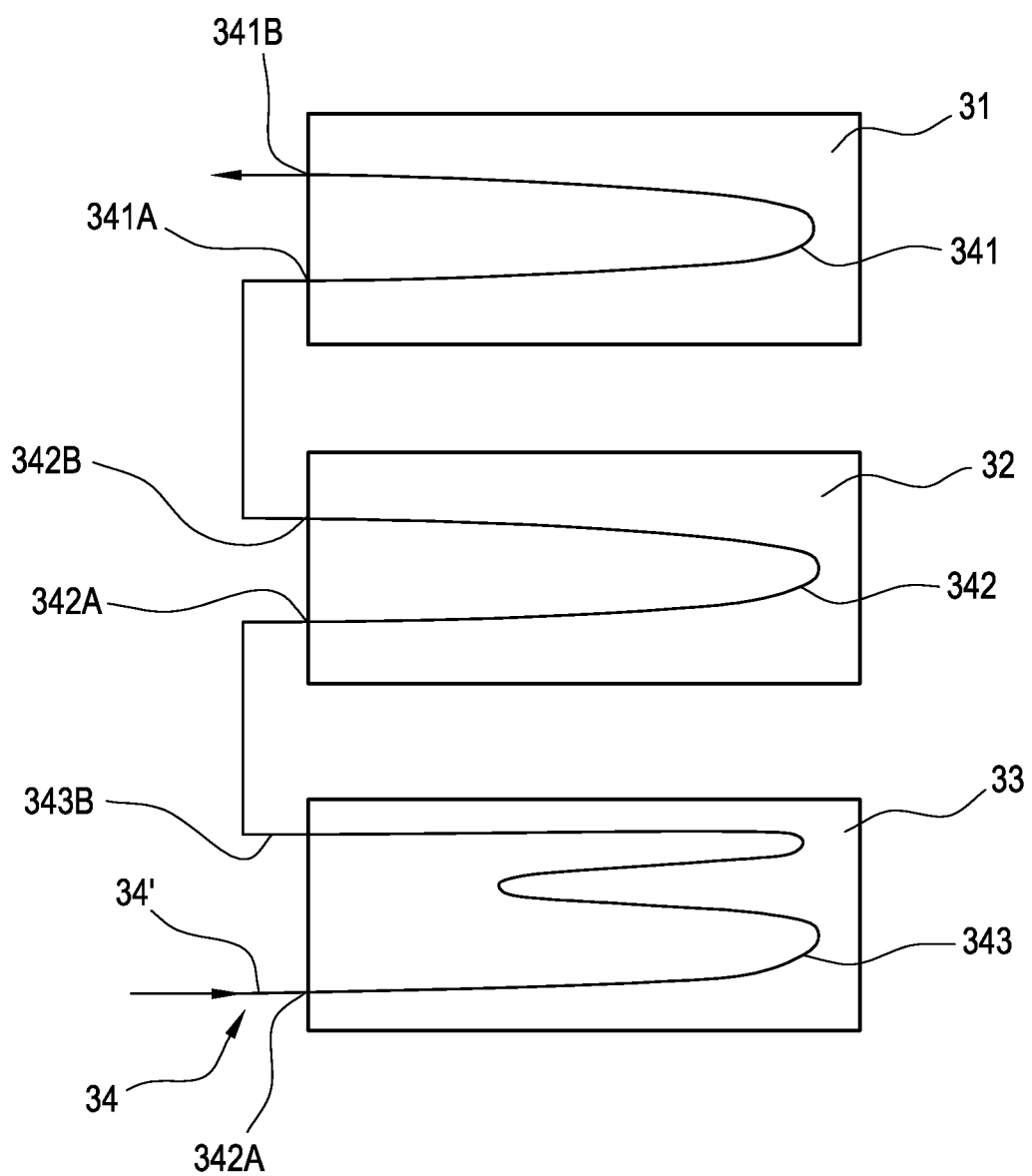
FIGS. 7A and 7B illustrate, respectively, a first and a second configuration of a circuit for cooling a female die element of the mould of FIG. 4.
Figure 7B:
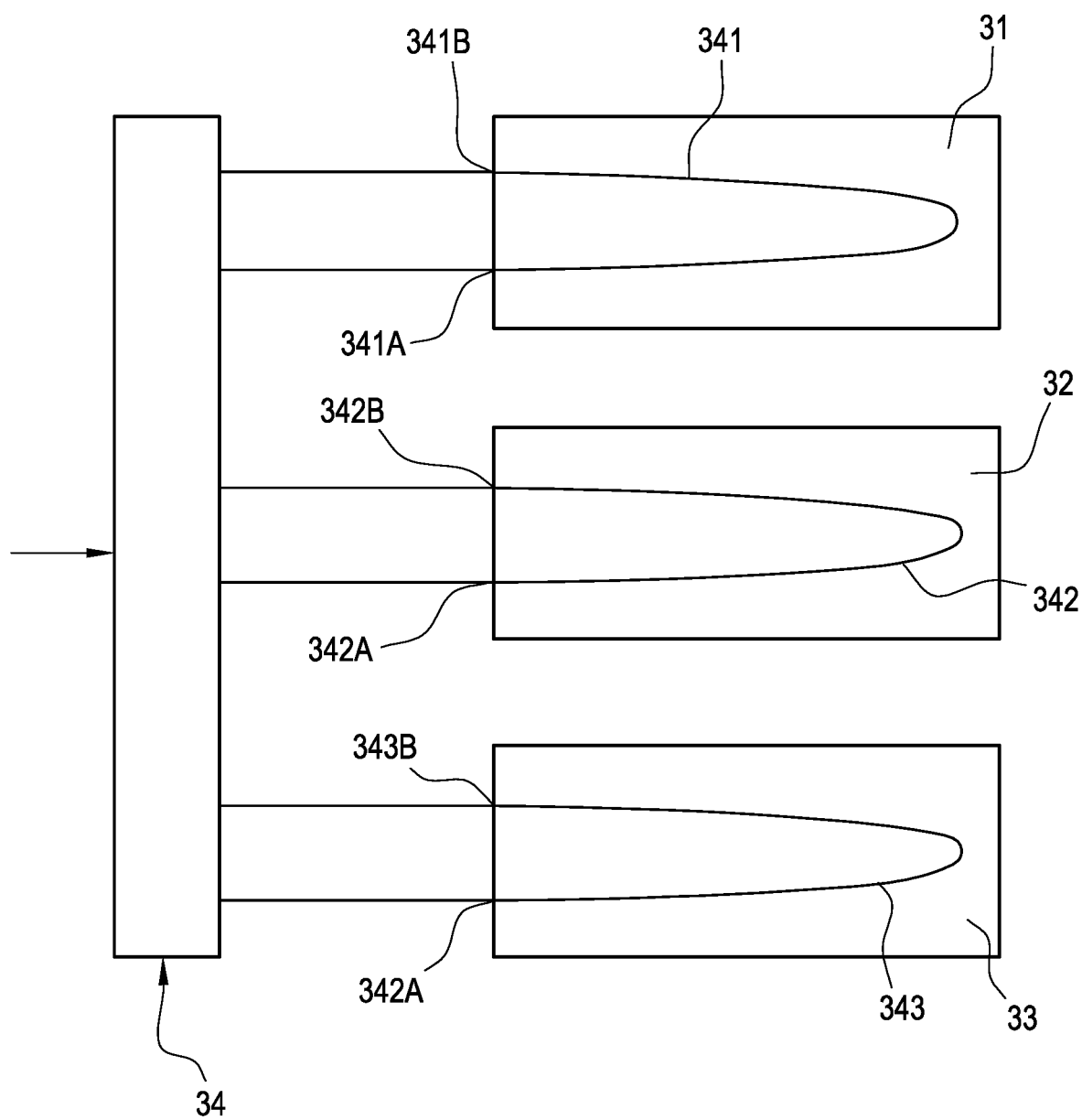

With reference to the accompanying drawings, the numeral 1 denotes a compression moulding machine for making closures (that is to say, a machine for making closures by a compression moulding process).

According to an aspect of this disclosure, the machine 1 is configured to make a closure 100 used for closing oil containers.

The closure 100 comprises a body 101. The closure 100 is axisymmetrically shaped about one of its axes. The body 101 comprises a first part 101A, configured to be screwed to the cap of the oil container, and a second part 101B, configured to be connected to the body of the oil container. The first part 101A of the closure body 101 comprises a first collar 101A', which extends from the second part 101B along the axis of symmetry in an out direction U. The first part 101A of the closure body 101 comprises a second collar 101A", which extends from the second part 101B along the axis of symmetry in the out direction U. The first collar 101A' and the second collar 101A" are concentric. The first collar 101A' surrounds the second collar 101A" The first collar 101A' comprises an upper thread FS on an outside surface of it (relative to the axis of symmetry). The upper thread FS is configured to be screwed to a thread of a cap of the oil container.

The second part 101B comprises a connecting collar 101B' and a transverse wall 101B", perpendicular to the axis of symmetry.

The connecting collar 101B' comprises a plurality of teeth 102 on an inside surface of it, facing the axis of symmetry. The plurality of teeth 102 protrude from the inside surface of the connecting collar 101B' to grip an edge of the oil container.

The closure 100 comprises a circumferential sealing wall 103, configured to create a fluid-tight seal between the closure 100 and the neck of the oil bottle the closure is mounted on. It should be noted that in this application, the circumferential sealing wall 103 is denoted more simply by the term "circumferential wall" 103. The circumferential wall 103 extends from the transverse wall 101B" along the axis of symmetry in the in direction E, opposite to the out direction U. The circumferential wall 103 is inclined to the axis of symmetry and converges towards the axis of symmetry in the out direction U.

The transverse wall 101B" comprises an opening A, through which the oil can flow out of the container.

The closure 100 comprises a plurality of fins 104. The plurality of fins are connected to the transverse wall 101B". The plurality of fins 104 extend from the transverse wall 101B" along the axis of symmetry in the in direction E. The plurality of fins 104 is inclined to the axis of symmetry and converges towards the axis of symmetry in the in direction E, in such a way as to face the opening A (that is, to be at least party aligned with the opening A along an orientation parallel to the axis of symmetry). The plurality of fins 104 allows conveying the oil and acts as an anti-bubbling element.

The closure 100 comprises a membrane 105. The membrane 105 is connected to the transverse wall 101B" to close the opening A. The membrane 105 has a concave profile in the out direction to facilitate its removal.

The closure 100 comprises a tab 106 (or removal element 106). The tab 106 is connected to the membrane 105 to allow it to be removed when the oil container is opened.

The machine 1 is therefore configured to make closures of this kind, which in the jargon of the trade, may be defined as "tear-off closures".

The machine 1 comprises a frame 1'.

The machine 1 comprises a rotary carousel 10. The rotary carousel 10 is configured to rotate about a first axis of rotation R1. The rotary carousel 10 comprises an upper platen (disc, cylinder) 10A and a lower platen (disc, cylinder) 10B. The upper platen 10A comprises an underside surface facing the second platen 10B. The second platen 10B comprises a top surface facing the first platen 10A.

The distance between the underside surface of the first platen 10A and the top surface of the second platen 10B is known as "gape" in the jargon of the trade and is labelled SB.

The first platen 10A comprises a plurality of upper housings 10A'. In an embodiment, each upper housing 10A' comprises a respective concavity, which opens onto the space between the first platen 10A and the second platen 10B. The housings 10A' of the plurality are disposed on a circumference of the first platen 10A and are spaced, preferably uniformly, around that outer circumference (that is to say, they are equispaced from each other).

The second platen 10B comprises a plurality of lower housings 10B'. In an embodiment, each lower housing 10B' comprises a respective concavity, which opens onto the space between the first platen 10A and the second platen 10B. The housings 10B' of the plurality are disposed on a circumference of the second platen 10B and are spaced, preferably uniformly, around that outer circumference (that is to say, they are equispaced from each other).

Each housing 10B' of the plurality of lower housings is aligned (at least partly) with a respective housing 10A' of the plurality of upper housings, along an orientation parallel to the first axis of rotation R1.

The machine 1 comprises a plurality of moulds 11. Each mould comprises a male die element 2 (hereinafter denoted simply by the term "male") and a female die element 3 (hereinafter denoted simply by the term "female").

Each mould 11 is movable between a closed configuration CC, in which the respective male 2 and the respective female 3 are in contact to define an expansion chamber CE for expanding a (plastic) material and having a shape corresponding to the closure to be made, and an open configuration CA, in which the male 10A and the female 10B are spaced apart.

Each male 2 of the plurality of moulds 11 is housed in a respective housing 10A' of the plurality of upper housings. In an embodiment, each male 2 is fixed relative to the first platen 10A. Each male 2 protrudes from the underside surface of the first platen 10A.

Each female 3 of the plurality of moulds 11 is housed in a respective housing 10B' of the plurality of lower housings. Each female 3 protrudes from the top surface of the second platen 10B. In an embodiment, each female 3 is movable relative to the second platen 10B in such a way as to come into contact with the respective male 2 to define the expansion chamber CE.

It should be noted that the movement of the female 3 relative to the male 2 is only one possible embodiment of this machine and in other embodiments, the male 2 might move relative to the female 3 or both the parts 2 and 3 might move towards and away from each other.

The machine 1 comprises an actuating unit 12. The actuating unit 12 is configured to move the parts of the machine 1.

The actuating unit 12 comprises a rotary actuator 121 configured to rotate the rotary carousel 10 about the first axis of rotation R1.

For each full turn of the rotary carousel 10, the machine 1 performs one working cycle in which it is configured to make a number of closures equal to the number of moulds 11 mounted on it. In other words, for each full turn of the rotary carousel 10, each mould 11 makes one closure.

As it rotates, the rotary carousel 10 defines one or more of the following working stations.
  a first working station SL1, in which each female 3 receives a charge of material and/or in which each male 2 releases a closure made in the preceding cycle (one complete turn of the rotary carousel 10);
  a second working station SL2, in which the female 3 is moved towards and into contact with the male 2 to define the expansion chamber CE and to form the closure; the second working station SL2 being angularly spaced from the first working station SL1 by a closing angle AC;
  a third working station SL3, in which the female 3 is detached from the male 2 to allow the moulded closure to be released (or withdrawn); the third working station SL3 being angularly spaced from the first working station SL1 by a reopening angle AA.

In an embodiment, the actuating unit 12 comprises a plurality of moulding actuators 122. Each moulding actuator 122 is configured to move the corresponding female 3 (and/or the corresponding male 2) along a moulding orientation S, parallel to the axis of rotation R1. In an embodiment, each moulding actuator 122 is configured to move the corresponding female 3 (and/or the corresponding male 2) along the moulding orientation S in a closing direction VC, oriented from the female 3 to the male 2, at the second working station SL2, to move the mould into the closed configuration CC. Each mould 11 remains in the closed configuration CC for angles of rotation of the rotary carousel included between the closing angle AC and the reopening angle AA.

In an embodiment, each moulding actuator 122 is configured to move the corresponding female 3 (and/or the corresponding male 2) along the moulding orientation S in an opening direction VA, oriented from the male 2 to the female 3, at the third working station SL3, to move the mould into the open configuration CA. Each mould 11 remains in the open configuration CA for angles of rotation of the rotary carousel included between the reopening angle AA and the closing angle AC of the next cycle (the next turn).

According to an aspect of this disclosure, embodiments are also imaginable which allow closing and reopening the mould: that is to say, to allow moving the mould between the closed configuration CC and the open configuration CA.

In one of these embodiments, the movement of the mould between the closed configuration CC and the open configuration CA is performed by a transmission unit 123, configured to transmit and/or convert the rotary motion of the rotary carousel 10 into a translational motion of a part of the mould 11, preferably the female 3.

For example, for each female 3, the machine 1 comprises a respective rod 123A and a respective slide element 123B. The rod 123A is connected to the corresponding female at one end of it and to the slide element 123B at the opposite end of it.

The machine 1 comprises a guide cam 124 to which the frame 1' is fixed. The guide cam 124 extends along a circumference which is aligned, along the moulding orientation S, with the circumference of the second platen 10B which houses the females 3 of the moulds 11.

The slide element 123B is in contact with the guide cam 124. That way, the profile of the guide cam 124 defines, for each angular position of the rotary carousel 10, a corresponding position of the female 3 along the moulding orientation S.

The machine 1 comprises a control unit 13, configured to send drive signals 131' to the actuating unit 12 (or to the plurality of moulding actuators 122, or to the rotary actuator 121) in order to drive it. The machine 1 comprises a user interface 131, connected to the control unit 13 to set working parameter values.

The control unit 13 is configured to determine the drive signals 131' as a function of the working parameter values entered by a user through the user interface 131.

Below is a detailed description of the features of each mould 11 of the plurality of moulds. For brevity, we will refer to a single mould, it being understood that one or more of the features described also apply to all the moulds 11 of the plurality.

In an embodiment, the male 2 of the mould 11 comprises an outer bush.21 (or extractor 21). The outer bush 21 is configured to be coupled to the corresponding upper housing 10A' of the first platen 10A. The outer bush 21 comprises an abutment surface 21A, which is configured to come into abutment against the female 3 in the closed configuration CC of the mould 11. The abutment surface 21A contributes to delimiting the expansion chamber E.

In an embodiment, the male 2 comprises a toothed bush 22. The toothed bush 22 is externally connected to the outer bush 21. On its cylindrical outer surface, the toothed bush 22 comprises a plurality of recesses 22A, which define the shape of the plurality of teeth 102 of the closure.

In an embodiment, the male 2 comprises a receiving bush 23. The receiving bush 23 is externally connected to the toothed bush 22. The receiving bush 23 is externally connected to the toothed bush 22 in such a way as to leave, along a radial orientation perpendicular to the moulding orientation S, a space that defines a flow gap extending along the moulding orientation S.

At the end of it facing towards the female 3, the receiving bush 23 comprises a bevel 23A. The bevel 23A defines the inclination of the circumferential wall 103 of the closure.

In an embodiment, the male 2 comprises a central block 24. The central block 24 is externally connected to the receiving bush 23. More specifically, the coupling between the receiving bush 23 and the central block 24 defines a circumferential gap 234 that is inclined to the moulding orientation S. This gap defines the shape and inclination of the plurality of fins 104.

The central block 24 comprises a membrane surface 241, facing towards the female 3 and concave relative to the female 3 to define the concavity of the membrane 105 of the closure 100.

In an embodiment, the receiving bush 23 and/or the toothed bush 22 and/or the central block 24 are movable relative to the outer bush 21. More specifically, in an embodiment, the unit including the receiving bush 23 and/or the toothed bush 22 and/or the central block 24 is movable relative to the outer bush 21 between a moulding position, in which the receiving bush is closer to the female 3 than the outer bush 21, and a release position, in which the receiving bush is equidistant or further from the female 3 than the outer bush 21, to allow the moulded closure 100 to be released.

It should be noted that in a preferred embodiment, the unit including the receiving bush 23 and/or the toothed bush 22 and/or the central block 24 remains fixed relative to the frame while the outer bush 21 slides along the moulding orientation S. That way, the outer bush is configured to press down on the connecting collar 101B' to detach the closure 100 from the male 2 so that the closure 100 can be withdrawn.

In an embodiment of this disclosure, the central block 24 is movable relative to the receiving bush 23 along the moulding orientation S between a working position, in which the central block 24 is proximal to the receiving bush 23 to define the gap 234, and a detached position, in which the central block 24 is distal from the receiving bush 23 to release the plurality of fins 104.

More specifically, the receiving bush 23 comprises a slide cavity 244 in which a piston of the central block 24 (that is, a piston attached to the central block) is received to slide therein.

The slide cavity 244 defines an actuating chamber, located upstream of the piston of the central block 24 along the sliding orientation S in the closing direction VC. The male 2 comprises a pressurizing duct 243 (which, in one embodiment, is also the injection duct 251 of the first cooling circuit 25 of the male 2). The pressurizing duct 243 is open onto the actuating chamber.

Pressurizing the actuating chamber facilitates displacing the central block, thereby detaching the moulded closure. Displacement of the central block 24 is caused mainly by the displacement of the outer bush 21 (extractor), which is configured to push the closure 100 in the extraction direction VE. The displacement of the closure 100 results in a corresponding displacement of the central body 24, which is entrained by the closure through the plurality of fins 104.

In an embodiment, the central block 24 is configured to slide in the slide cavity 244 without a fluid seal. In this embodiment, therefore, although it pushes the central block 24, the air flows past the central block 24.

In an embodiment, the male 2 comprises at least one communication passage which connects the slide cavity 244 to the flow gap defined between the toothed bush 22 and the receiving bush 23. In an embodiment, the communication passage is open onto the slide cavity 244 at a position opposite to the pressurizing duct 243 with respect to the central block 24.

In this embodiment, the air enters the slide cavity 244 through the pressurizing duct 243, flows past the central block 24, which is smaller in size than the slide cavity 244, and reaches the communication passage and the flow gap to apply an ejecting force on the closure 100.

In an example embodiment, the central block 24 comprises a return spring 242. The return spring 242 is configured to apply an elastic force on the central block 24 (that is, on the piston of the central block 24) along the moulding orientation S in the opening direction VA. More specifically, the return spring 242 is disposed inside the slide cavity 244 at a position downstream of the piston of the central block 24 along the sliding orientation S in the closing direction VC. Thus, once the pressurizing duct 243 has pressurized the actuating chamber and the central block 24 has been taken to the detached position, depressurizing the actuating chamber combined with the action of the return spring 242 allows bringing the central block back to the working position.

In an embodiment, the male 2 comprises a first cooling circuit 25. The first cooling circuit 25 traverses the male 2 to remove heat therefrom. More specifically, in an embodiment, the cooling circuit 25 comprises an injection duct 251 configured to convey a cooling fluid to a zone proximate to the female 3,—for example in an annular duct defined between the central block 24 and the receiving bush 23. In an embodiment, the cooling circuit 25 comprises a recycling duct 252 configured to recycle the cooling fluid injected into the zone proximate to the female 3,— for example by the annular duct.

The female 3 comprises a first block 31. In an embodiment, the female 3 comprises a second block 32. In an embodiment, the female 3 comprises a third block 33.

The first block 31, the second block 32 and the third block 33 are disposed one inside the other in a telescopic structure.

In an embodiment, the first block 31 is movably connected to the second block 32. In an embodiment, the first block 31 is connected to the second block 32 by a first guide element 311. The first guide element 311 has a first end that is connected to the first block 31 and a second end that is connected to the second block 32. The first guide element 311 is configured to slide in a respective seat 312 in the first block 31. The seat 312 houses a first spring 313, inside which the first guide element 311 passes.

It should be noted that, in an embodiment, the spring is configured to apply, between the first block 31 and the second block 32, a contact force having an orientation parallel to the moulding orientation S and a direction such as to move the two blocks closer together to keep them in contact with each other. In this embodiment, the first block 31 and the second block 32 are in contact with the mould in the open configuration CA. Further, when the first block 31 and the second block 32 are in contact, the first guide element 311 comes into abutment with the seat 312 in the closing direction VC. That means that in an embodiment, during the movement of the mould 11 from the open configuration CA to the closed configuration CC of the mould, the first block 31 and the second block 32 move as one. Otherwise, during the movement of the mould 11 from the closed configuration CC to the open configuration CA of the mould, the second block 32 is configured to slide relative to the first block 31 along the moulding orientation S in the opening direction until the first guide element 311 comes into abutment against the seat 312 in the opening direction.

This therefore allows modular opening of the female 3, where opening of the first block 31 is delayed with respect to the second block 32.

In other embodiments, the contact force is directed in such a way as to move the first block 31 away from the second block 32. In such an embodiment, during the movement of the mould 11 from the open configuration CA to the closed configuration CC of the mould, the first block 31 is spaced from the second block 32. The first block 31 comes into contact with the second block 32 after the first block 31 comes into abutment against the male 2. In effect, the movement of the female 3 along the moulding orientation S, inhibited by the abutment between the first block 31 against the male 2, causes the first spring 313 to be compressed, thereby displacing the second block 32 until it comes into contact with the first block 31.

In such an embodiment, therefore, also the closing of the second block 32 is delayed with respect to the first block 31.

In an embodiment, the second block 32 is movably connected to the third block 33.

The female 3 comprises a second spring 323, interposed between the second block 32 and the third block 33 along the moulding orientation S.

The female 3 comprises a second guide element 324, which is elongate along the moulding orientation S and which is disposed inside the second spring 323 to guide the compression thereof.

The guide element 324 is configured to stop against the second block 32 so as to limit the distance between the third block 33 and the second block 32 (that is, to limit the stretching of the second spring 323). When the female 3 is opened, this feature allows the third block 33 to engage the second block 32 after moving (that is, sliding) for a certain length along the moulding orientation S until the guide element 324 stops against the second block 32 in the opening direction VA.

The second spring 323 is configured to generate a respective contact force directed in such a way as to move the second block 32 away from the third block 33. In such an embodiment, during the movement of the mould 11 from the open configuration CA to the closed configuration CC of the mould, the second block 32 is spaced from the third block 33.

The third block 33 comes into contact with the second block 32 after the second block 32 comes into abutment against the first block 31. In effect, following contact between the second block 32 against the first block 31, the movement of the female 3 along the moulding orientation S causes the second spring 323 to be compressed, thereby displacing the third block 33 until it comes into contact with the second block 32.

When the third block 33 has also stopped against the second block 32, the expansion chamber is fully defined and the charge of plastic material is spread therein.

This configuration of the female, with the first spring 313 and the second spring 323, allows closing and opening the mould (moving between the open configuration CA and the closed configuration CC) in a modular fashion. These features offer several advantages. In effect, in these solutions, the material is not spread over the zone on the expansion chamber corresponding to the membrane (whose thickness is very limited) until the other zones have been filled. The progressive closing therefore allows minimizing the time needed to spread the plastic material through the very narrow gaps, which might otherwise have a negative effect on the way the material is spread.

In an embodiment, the first block 31 comprises an inner bush 314. The inner bush 314 comprises an abutment surface, configured to come into abutment against the male 2, preferably against the abutment surface 21A of the outer bush 21 of the male 2.

In an embodiment, the inner bush 314 comprises a first cylindrical surface and a second cylindrical surface whose radius is smaller than that of the first cylindrical surface. In an embodiment, the first cylindrical surface is smooth. The first cylindrical surface delimits the expansion chamber CE and defines an outside surface of the connecting collar 101B' of the closure 100.

The second cylindrical surface comprises a "female" thread which receives the charge of material and defines the upper thread FS of the closure 100.

In an embodiment, the second block 32 comprises a first bush 321 and a second bush 322. The second bush 322 is disposed inside the first bush 321. The first bush 321 and the second bush 322 are concentric. At the ends of them proximate to the male 2, the first bush 321 and the second bush 322 are spaced apart to define a thickness of the second collar 101A" of the closure 100.

The first bush 321 is concentric with the inner bush 314 of the first block 31. In the closed configuration CC of the mould 11, the first bush 321 and the second cylindrical surface of the inner bush 314 of the first block 31 are spaced apart to define a thickness of the first collar 101A' of the closure 100.

The second bush 322 comprises a hollow in which the plastic material is configured to flow in order to form the tab 106 of the closure 100.

In an embodiment, the third block 33 comprises a plunger 331, disposed inside the second bush 322 of the second block 32. The plunger 331 is configured to slide inside the second bush 322 of the second block 32.

The plunger 331 comprises a convex surface which is configured to be coupled to the corresponding concave surface of the central block 24 of the male 2. The convex surface of the plunger 331 and the concave surface of the central block 24 of the male 2 are, in the closed configuration CC of the mould 11, spaced apart by a value that defines the thickness of the membrane 105 of the closure 100.

In an embodiment, the female 3 comprises a second cooling circuit 34. The second cooling circuit 34 is configured to cool the female 3, preferably the first block 31 and/or the second block 32 and/or the third block 33. The second cooling circuit 34 comprises a recirculation duct 34' configured to circulate a cooling fluid in a cooling direction. The recirculation duct traverses the first block 31 and/or the second block 32 and/or the third block 33. More specifically, in an embodiment, the recirculation duct 34' extends in the cooling direction, traversing first the third block 33, then the second block 32 and, lastly, the first block 31. This embodiment is purely exemplary since the order in which the modules are traversed may be varied, as anyone skilled in the art will readily understand.

In an embodiment, the second cooling circuit comprises, for each first block 31, second block 32 and third block 33, one or more of the following features:
- a respective cooling inlet 341A, 342A, 343A, through which the cooling fluid enters;
- a respective cooling outlet 341B, 342B, 343B, through which the cooling fluid is conveyed out of the respective block;
- a respective internal duct 341, 342, 343, each connected to a respective cooling inlet 341A, 342A, 343A and to the respective cooling outlet 341B, 342B, 343B to define a cooling path within the respective block.

In an embodiment, the internal duct 343 of the third block comprises a first stretch, passing through the plunger 331 along the moulding orientation S in the closing direction VC, and/or a second stretch, passing through the plunger 331 along the moulding orientation S in the opening direction VA, and/or a third stretch which connects one end of the second stretch to the cooling outlet 343B.

In an embodiment, the internal duct 342 of the second block 32 comprises a cooling ring AR, formed on the outside of the first bush 321 of the second block 32 and connected to the cooling inlet 342A and to the cooling outlet 342B of the second block 32.

In an embodiment, the internal duct 341 of the first block 31 comprises a cooling chamber CR, formed on the outside of the inner bush 314 of the first block 31 and connected to the cooling inlet 341A and to the cooling outlet 341B of the first block 31.

In an embodiment, the internal ducts 341, 342, 343 of the first block 31, second block 32 and third block 33 are connected to each other in series. In other embodiments, the internal ducts 341, 342, 343 of the first block 31, second block 32 and third block 33 are connected to each other in parallel.

According to an aspect of this disclosure, the actuating unit 12 is configured to move the female 3 (or the male 2) along the moulding orientation at a variable speed. More specifically, the actuating unit 12 (that is, the moulding actuators 122) is configured to move the female 3 (or the male 2) along the moulding orientation at a speed that decreases as the female 3 approaches the male 2. In addition, the actuating unit 12 (that is, the moulding actuators 122) is configured to provide the female 3 (or the male 2) with a force (torque) along the moulding orientation that increases as the female 3 approaches the male 2.

This feature allows providing more force when it is necessary to expand the material through the narrower gaps and, instead, a higher speed when the material flows more easily.

In the same way, in the embodiment comprising the guide cam 124, the profile of the cam is designed in such a way as to raise the female 3 rapidly during an initial step of moulding and to progressively reduce the slope of the profile as the female 3 approaches the male 2.

In other words, the derivative of a working curve, defined by the extension in the profile plane of the guide cam 124 (having the circumferential coordinate, or angle of rotation of the carousel 10, in the x-axis and the moulding orientation S in the y.-axis) has a first value, corresponding to an initial step of moulding, and a second value, smaller than the first value, corresponding to a final step of moulding.

In an embodiment, the machine 1 comprises an auxiliary unit 14. The auxiliary unit 14 is configured to allow feeding a charge of plastic material to the female 3 of each mould 11. The auxiliary unit 14 is configured to allow the closure 100 to be withdrawn from the male 2 of each mould 11.

In an embodiment, the auxiliary unit 14 comprises a first rotary device 14A.

In an embodiment, the machine 1 comprises un extruder 15, configured to extrude a predetermined charge of material to be conveyed into a respective mould.

The first rotary device 14A comprises a rotary disc 141A which rotates about a second axis of rotation R2, parallel to the first axis of rotation R1. The rotary disc 141A is disposed between the upper platen 10A and the lower platen 10B. In other words, the rotary disc 141A is aligned with the upper platen 10A and the lower platen 10B along the moulding orientation S. The thickness of the rotary disc 141A is therefore smaller than the gape SB.

The first rotary device 14A comprises a plurality of conveyors 142A. The plurality of conveyors 142A are connected to the rotary disc 141A on the underside surface 141A' thereof, preferably at the edge of the underside surface 141A', to rotate as one with the rotary disc 141A. The conveyors 142A of the plurality are angularly spaced in such a way that as the first rotary device 14A rotates, each conveyor is aligned with a respective mould 11 of the machine 1 along the moulding orientation S. The conveyors 142A each comprise a respective conveying seat 142A', configured to receive and hold the charge of material during the rotation of the rotary device 14A. Each conveyor 142A is movable between a withdrawing position, where it is out of alignment with the respective mould 11 and aligned with the extruder 15, along the moulding orientation S, to receive the charge, and a releasing position, where it is aligned with the respective mould 11 (preferably aligned with the female 3 of the respective mould 11) to release the charge of material.

In an embodiment, the first rotary device 14A comprises a withdrawal crown 143A. The withdrawal crown 143A is configured to withdraw the closures 100 from the male 2 of each mould.

The withdrawal crown 143A comprises a profiled outer circumference including a plurality of recesses 143A', preferably having a semi-circular profile.

The withdrawal crown 143A is connected to a top surface 141A" of the rotary disc 141A and rotates as one therewith. As the withdrawal crown 143A rotates, each recess 143A' moves between a withdrawing position, in which it is aligned with a respective mould 11 (preferably with the male 2 of a respective mould 11) along the moulding orientation S in order to withdraw the moulded closure 100, and a releasing position where it is out of alignment with the respective mould 11 in order to release the moulded closure 100.

In an embodiment, each recess 143A' is aligned with a respective conveyor 142A along the moulding orientation S. That way, the conveyor 142A is aligned with a female 3 of a mould 11 along the moulding orientation S at the same time as the recess 143A' is aligned with the male 2 of the same mould 11. The machine 1 can therefore withdraw the moulded closure 100 and simultaneously feed the charge of material for the next production cycle.

In an embodiment, the auxiliary unit 14 comprises a second rotary device 14B. In an embodiment, the rotary device 14B comprises a conveying crown 141B, having a respective profiled outer circumference including a respective plurality of recesses 141B'. When the withdrawal crown 143A is at its releasing position, the rotary device 14B is configured to receive from it a moulded closure 100 withdrawn from a respective mould 11. More in detail, the withdrawal crown 143A is configured to release the closures 100 withdrawn by it to the conveying crown 141B. In still more detail, each recess 143A' of the withdrawal crown 143A is configured to be aligned radially with a respective recess 141B of the withdrawal crown 141B for the latter to convey the corresponding closure 100.

In an embodiment, the machine 1 comprises a conveyor belt 16. The second rotary device 14B is configured to withdraw the closures from the first rotary device 14A and to release them onto the conveyor belt 16. More specifically, the conveying crown 141B is aligned with the conveyor belt along the moulding orientation S in order to release the closures 100.

It should be noted that the mould 11 described in this document has an extension along the moulding orientation S that is greater than the average of the moulds that can be used in the machine 1. For this reason, the gape SB of the machine 1 may be too large for conventional moulds (this would also require adapting the stroke of the female 3 relative to the male 2). Moreover, with a view to replacing the mould 11 on existing machines, the gape may not be large enough. It is therefore of fundamental importance to provide a solution that makes the machine flexible and capable of working with both kinds of moulds.

This disclosure provides an adapting system configured to vary a minimum distance between the male 2 and the female 3 of each mould 11 along the moulding orientation S to allow the auxiliary unit to perform the operations needed to feed the charge of material and withdraw the moulded closure.

In an embodiment, the adapting system is a compression system configured to compress the female 3 of each mould 11, at the first working station SL, that is to say, when the female 3 receives the charge of material and/or when the male 2 releases the moulded closure 100.

The compression system is configured to compact the first block 31, the second block 32 and the third block 33 in such a way as to limit the extension of the female 3 of the mould 11.

In an embodiment, the adapting system is defined by an adaptation performed by the guide cam 124. In other words, the working curve has a minimum absolute value that takes into account the need for the female 3 to be further down when it is at the first working station SL1.

In an embodiment, the male 2 of each mould is made movable relative to the upper platen 10A. In such an embodiment, therefore, the male 2 of each mould 11 is movable between a withdrawing position, where it is disposed at a first level along the moulding orientation S to allow the auxiliary unit 14 to withdraw the closure 100, and a moulding position, where it is disposed at a second level along the moulding orientation S, lower than the first level. More specifically, the male 2 is at the withdrawing position when it is at the first working station SL1.

According to an aspect of it, this disclosure also provides a method for making closures, preferably closures for oil containers.

The method comprises a step of preparing a machine 1 for moulding closures from a charge of plastic material. The machine 1 comprises a rotary carousel 10 which rotates about a first axis of rotation R1 and comprising an upper platen 10A and a lower platen (disc, cylinder) 10B.

The method comprises a step of preparing a plurality of moulds 11, each including a male die element 2, hereinafter denoted simply by the term "male" 2, and female die element 3, hereinafter denoted simply by the term "female" 3, which are aligned along a moulding orientation S, parallel to the first axis of rotation R1. The males 2 of the plurality of moulds are disposed on an edge of the upper platen, angularly spaced from each other. The females 3 of the plurality of moulds are disposed on an edge of the lower platen, angularly spaced from each other.

The method comprises a step of rotating the rotary carousel. During the step of rotating, the rotary carousel 10 transports the plurality of moulds connected to it to the following working stations:
- a first working station SL1, in which each female 3 receives a charge of material and/or in which each male 2 releases a closure made in a preceding cycle (one complete turn of the rotary carousel 10);
- a second working station SL2, in which the female 3 is moved towards and into contact with the male 2 to define the expansion chamber CE and to form the closure; the second working station SL2 being angularly spaced from the first working station SL1 by a closing angle AC;
- a third working station SL3, in which the female 3 moves away from the male 2 to allow the moulded closure to be released (or withdrawn); the third working station SL3 being angularly spaced from the first working station SL1 by a reopening angle AA.

In an embodiment, the method comprises a step of feeding. The step of feeding is performed preferably when the mould is at the first working station SL1. In the step of feeding, an auxiliary unit 14 feeds a charge of material to the mould 11 which is located at the first working station SL1. In the step of feeding, a first rotary device 14A of the auxiliary unit receives a charge of material from an extruder and feeds it to the female 3 of the mould 11 which is located at the first working station SL1. In the step of feeding, a plurality of conveyors 142A receive respective pluralities of charges of material which are then conveyed to respective females 3 of the moulds 11. In an embodiment, the method comprises a step of closing.

The step of closing is performed preferably when the mould is at the second working station SL2. In the step of closing, the mould moves from an open configuration CA, where the respective male 2 and the respective female 3 are spaced apart, to a closed configuration CC, where the respective male 2 and the respective female 3 are in contact to define the expansion chamber CE.

In an embodiment, in the step of closing, each female 3 moves along the moulding orientation S relative to the male 2 until coming into contact therewith.

In an embodiment, the step of closing comprises a step of closing at the top, in which the male 2 moves relative to the female 3. More specifically, in the step of closing, the toothed bush 22 and/or the central block 24 move relative to the outer bush 21 from a release position, in which the receiving bush is equidistant or further from the female 3 than the outer bush 21, to allow the moulded closure 100 to be released, to a moulding position, in which the receiving bush is closer to the female 3 than the outer bush 21.

The step of closing comprises a step of primary closing. The step of closing comprises a step of secondary closing.

In an embodiment, the step of closing comprises a step of tertiary closing.

In the step of primary closing, a first block 31 of the female 3 moves until it comes into contact with the male 2. In an embodiment, in the step of primary closing, a second block 32 moves together with the first block 31 along the moulding orientation S in a closing direction VC (directed from the female 3 to the male 2).

In this embodiment, therefore, the first block 31 and the second block 32 move until they come into contact with the male 2.

In the step of secondary closing, a third block 33 moves relative to the first block 31 and/or relative to the second block 32 along the moulding orientation S in the closing direction until coming into contact with the first block 31 and/or the second block 32. By the step of secondary closing, the expansion chamber CE is completely delimited in order to define the final shape of the closure 100.

In some advantageous embodiments, the step of secondary closing is a movement of the second block 32 along the moulding orientation S relative to the first block 31 after the first block 31 has already come into contact with the male 2 in the step of primary closing. In these embodiments, the method therefore comprises the step of tertiary closing, in which the third block 33 moves relative to the first block 31 and/or relative to the second block 32 along the moulding orientation S in the closing direction until coming into contact with the first block 31 and/or the second block 32 to define the expansion chamber CE.

For clarity, it is specified that the step of tertiary closing corresponds to the step of secondary closing of the embodiment in which the first block 31 and the second block 32 are constrained to move together in the closing direction VC. The step of tertiary closing is, however, defined only in the case where the first block 31 and the second block 32 are not constrained to move together in the closing direction VC.

The step of closing thus causes the charge of material to migrate into the spaces of the expansion chamber CE defined by the contact between the male 2 and the female 3.

The fact that the step of closing is modular facilitates migration of the charge of material and improves the quality of spreading the plastic material.

The method comprises a step of holding to allow the plastic material inside the mould to set and harden. In the step of holding, the mould 11 is held in the closed configuration CC along the stretch between the second working station SL2 and the third working station SL3 (that is to say, for a length of time equal to the difference between the opening angle AA and the closing angle AC divided by an angular speed of rotation of the carousel 10).

The method comprises a step of opening the mould 11. The step of opening the mould 11 comprises a step of primary opening. The step of opening comprises a step of secondary opening. The step of opening comprises a step of tertiary opening.

In the step of primary opening, the third block 33 of the female 3 is detached from the second block 32 along the moulding orientation S in the opening direction VA. In the step of primary opening, the plunger 331 of the female 3 (of the third block 33) is detached from the central block 24 of the male 2.

In the step of secondary opening, the second block 32 moves relative to the first block 31 along the moulding orientation S in the opening direction VA, preferably keeping a constant distance from the third block 33 (in other words, it moves relative to the first block 31 as one with the third block 33). In the step of secondary opening, the first collar 101A', which is interposed between the first block 31 and the second block 32 with the outer thread FS facing the first block 31, allows the second block 32 to slide relative to the first block 31 because the thread keeps the first block 31 stationary. Then, when the second block 32 has moved far enough along the moulding orientation S for it to be clear of the first collar 101A', the latter can bend in such a way that the first block 31, too, can move back under the action of the first spring 313 (thus performing the step of tertiary opening).

In the step of tertiary opening, the first block 31 is detached (moves away) from the male 2 along the moulding orientation S in the opening direction VA. In a step of actuating, the first block 31, as it moves, reduces its distance from the second block 32, until coming into contact therewith. In other embodiments, the first block 31, as it moves, remains at a constant distance from the second block 32 (in other words, the whole of the female 3 moves as one along the moulding orientation S in the opening direction VA). In an embodiment, the first block 31 moves under the action of the elastic force applied by the first spring 313, compacting it on the second block 32.

In an embodiment, the step of opening comprises a step of releasing (detaching). In the step of releasing, the closure 100 just moulded is released from the respective male 2.

In an embodiment, the step of releasing comprises a step of releasing the fins. In the step of releasing the fins, the central block 24 moves relative to the receiving bush 23 along the moulding orientation S between a working position, in which the central block 24 is proximal to the receiving bush 23 to define the gap 234, and a detached position, in which the central block 24 is distal from the receiving bush 23 to release the plurality of fins 104.

More specifically, a piston of the central block 24 (that is, a piston attached to the central block) slides inside a slide cavity 244 of the receiving bush 23.

In the step of releasing the fins, a pressurizing duct 243 (which, in one embodiment, is also the injection duct 251 of the first cooling circuit 25 of the male 2) pressurizes an actuating chamber of the slide cavity 244 (the actuating chamber being preferably located upstream of the piston of the central block 24 along the sliding orientation S in the closing direction VC). The pressure in the actuating chamber acts on the piston of the central block 24 and displaces it from the working position to the detached position.

It should be noted that the pressurizing action of the actuating chamber is only partly responsible for displacing the central block 24. In effect, the displacement of the central block from the working position to the detached position is due to the movement of the extractor 21 (outer bush 21). This movement causes the displacement of the closure 100 which, however, on account of the plurality of fins 104, entrains the central block 24 towards the detached position, overcoming the force of a return spring 242. Pressurizing the actuating chamber, however, facilitates detachment of the closure by contributing to displacing the central block 24 towards the detached position.

In an embodiment, the step of releasing the fins comprises a step of elastically returning. In the step of elastically returning, the return spring 242 applies an elastic force on the central block 24 (that is, on the piston of the central block 24) along the moulding orientation S in the opening direction VA. The return spring 242, being disposed inside the slide cavity 244 at a position downstream of the piston of the central block 24 along the sliding orientation S in the closing direction VC, pushes the central block towards the working position. Thus, when the actuating chamber ceases to be pressurized, the return spring 242 keeps the central block 24 at the working position.

In an embodiment, the step of releasing comprises a step of mutual movement between a moulding unit, which includes the receiving bush 23 and/or the toothed bush 22 and/or the central block 24, and the outer bush 21. More specifically, in the step of releasing, the outer bush 21 moves relative to the moulding unit between a moulding position, in which the moulding unit is closer to the female 3 than the outer bush 21, and a releasing position, in which the moulding unit is equidistant or further from the female 3 than the outer bush 21, in order to allow the moulded closure 100 to be released. As it moves relative to the moulding unit, the outer bush 21 pushes the connecting collar 101B' in the closing direction VC, thereby detaching the closure 100 from the moulding unit.

In other embodiments, in the step of moving, the moulding unit moves relative to the outer bush 21.

The method comprises a step of withdrawing, in which the auxiliary unit 14 picks up (withdraws) the moulded closures 100 from the plurality of moulds 11.

In the step of withdrawing, a withdrawal crown 143A of the first rotary device 14A withdraws the closures from the male 2 of each mould. The withdrawal crown 143A is connected to a top surface 141A" of the rotary disc 141A and rotates as one therewith.

On a profiled outer circumference of it, the withdrawal crown 143A comprises a plurality of recesses 143A', preferably having a semi-circular profile. The step of withdrawing comprises a step of rotating the withdrawal crown 143A in which each recess 143A' moves between a withdrawing position, in which it is aligned with a respective mould 11 (preferably with the male 2 of a respective mould 11) along the moulding orientation S in order to withdraw the moulded closure 100, and a releasing position where it is out of alignment with the respective mould 11 in order to release the moulded closure 100.

In an embodiment of the method, each recess 143A' is aligned with a respective conveyor 142A along the moulding orientation S to perform the step of withdrawing simultaneously with the step of feeding of the next production cycle.

In an embodiment, the method comprises a step of conveying. In the step of conveying, a second rotary device 14B of the auxiliary unit 14 is configured to convey the closures 100 from the first rotary device 14A to a further conveyor or to a container. When the withdrawal crown 143A is at its releasing position, the rotary device 14B receives from it a moulded closure 100 withdrawn from a respective mould 11. More in detail, a withdrawal crown 143A of the first rotary device 14A releases the closures 100 withdrawn by it to a conveying crown 141B of the second rotary device 14B.

In an embodiment, in the step of conveying, the second rotary device 14B withdraws the closures from the first rotary device 14A and releases them onto the conveyor belt 16. More specifically, the conveying crown 141B is aligned along the moulding orientation S and releases the closures 100 onto the conveyor belt 16 by gravity.

It should be noted that the step of conveying by the second rotary device 14B is optional and might not form part of the method that this disclosure intends to protect.

The method comprises a step of actuating by means of an actuating unit 12. In the step of actuating, the rotary carousel 10 is set in rotation about the first axis of rotation R1. In the step of actuating, each female 3 (or each male 2) is actuated so as to move along the moulding orientation S, in a closing direction, to close the corresponding mould 11, or in an opening direction to open the corresponding mould 11.

The step of actuating comprises a step of setting the rotary carousel in rotation about the first axis of rotation R1 by means of a rotary actuator 121. The step of actuating comprises a step of moving each female 3 (and/or each male 2) along a moulding orientation S by means of a plurality of moulding actuators 122.

In one of these embodiments, the step of moving each female 3 relative to the male 2 (relative to the frame 1' of the machine) is performed by a transmission unit which transmits and/or converts the rotary motion of the rotary carousel 10 into a translational motion of a part of the mould 11, preferably the female 3.

In this embodiment of the method, the machine 1 comprises, for each female 11, a respective rod 123A and a respective slide element 123B. The rod 123A is connected to the corresponding female at one end of it and to the slide element 123B at the opposite end of it.

In this embodiment of the method, a guide cam 124 of the machine 1 guides the slide element 123B in its movement along the moulding orientation S, thus moving each female 3 towards or away from the corresponding male 2. The step of moving follows a working curve, defined by the extension in the profile plane of the guide cam 124 and having the circumferential coordinate, or angle of rotation of the carousel 10, in the x-axis and the moulding orientation S in the y.-axis. That way, the profile of the guide cam 124 defines, for each angular position of the rotary carousel 10, a corresponding position of the female 3 along the moulding orientation S.

The method comprises a step of controlling, in which a control unit 13, sends drive signals 131' to the actuating unit 12 (or to the plurality of moulding actuators 122, or to the rotary actuator 121) in order to drive it. The method comprises a step of setting working parameters, in which a user, through a user interface 131 connected to the control unit 13, sets the values of the working parameters as a function of which the control unit 13 generates the drive signals 131' for the actuating unit 12.

In an embodiment, the method comprises a step of cooling. In the step of cooling, the plurality of moulds 11 are cooled. In the step of cooling, each male 2 and each female 3 are cooled.

The step of cooling comprises a step of cooling the female 3. In the step of cooling the female 3, a second cooling circuit 34 preferably cools the first block 31 and/or the second block 32 and/or the third block 33 of the female 3. In the step of cooling the female 3, a recirculation duct 34' of the second cooling circuit 34 circulates a cooling fluid in a cooling direction through the first block 31 and/or the second block 32 and/or the third block 33. More specifically, in the step of cooling the female 3, the recirculation duct 34 first cools the third block 33, then the second block 32 and, lastly, the first block 31.

Purely by way of example, in the step of cooling the female 3, the recirculation duct follows the following paths, in chronological order:
- a first stretch, passing through the plunger 331 along the moulding orientation S in the closing direction VC;
- a second stretch, passing through the plunger 331 along the moulding orientation S in the opening direction VA;
- a third stretch which connects one end of the second stretch to the cooling outlet 343B of the third block 33;
- a cooling ring AR, formed on the outside of the first bush 321 of the second block 32 and connected to the cooling inlet 342A and to the cooling outlet 342B of the second block 32;
- a cooling chamber CR, formed on the outside of the inner bush 314 of the first block 31 and connected to the cooling inlet 341A and to the cooling outlet 341B of the first block 31.

In the step of cooling, the male 2 is cooled by a first cooling circuit 25. More specifically, an injection duct 251 conveys a cooling fluid to a zone proximate to an annular duct defined between the central block 24 and the receiving bush 23. In addition, a recycling duct 252 recycles the cooling fluid from the annular duct.

In an embodiment, the method comprises a step of changeover, in which the plurality of moulds 11 are replaced with moulds of different size and features to make closures of a different kind. In the step of changeover, with an equal value of gape SB, the different size of the moulds 11 along the moulding orientation when mounted on the machine 1 varies the distance between the male 2 and the female 3 in the open configuration CA of the mould 11. Ease of access for the auxiliary unit 14 to feed the charge of material and withdraw the closure 100 is therefore varied.

To overcome these problems, the method comprises a step of adapting.

According to one aspect of the step of adapting, a compression system compresses the female 3 of each mould 11, at the first working station SL1. In other words, the compression system compresses the female in order to reduce its dimensions when the female 3 is receiving the charge of material and/or when the male 2 is releasing the moulded closure 100.

The compression system compacts the first block 31, the second block 32 and the third block 33 in such a way as to limit the extension of the female 3 of the mould 11 along the moulding orientation S.

According to a further aspect, the step of adapting comprises a step of adapting the guide cam 124 or of replacing the guide cam 124. Whichever the case, be it adapting or replacing, the working curve has a minimum absolute value that takes into account the need for the female 3 to be further down when it is at the first working station SL1. The minimum absolute value of the working curve will be proportional to the extension of the mould 11 along the moulding orientation S.

The step of adapting might also include a step of moving the male 2 relative to upper platen 10A. In such an embodiment, therefore, the male 2 of each mould 11 is moved between a withdrawing position, where it is disposed at a first level along the moulding orientation S to allow the auxiliary unit 14 to withdraw the closure 100, and a moulding position, where it is disposed at a second level along the moulding orientation S, lower than the first level. In an embodiment, the step of moving is performed when the male 2 is at the first working station SL1.

The following paragraphs, listed in alphanumeric order for reference, are non-limiting example modes of describing this invention.

A. A mould 11 for the production of closures (preferably of plastic material) with a tear-off membrane, in a compression moulding machine 1, the mould comprising a male die element 2, including a first abutment surface 21A, and a female die element 3, movable relative to each other along a moulding orientation S, such that the mould 11 is positionable between a closed configuration, in which the male die element 2 and the female die element 3 are in contact with each other, and an open configuration, in which the male die element 2 and the female die element 3 are spaced apart, wherein the female die element 3 includes:
- a first block 31, a second block 32 and a third block 33, aligned with each other and movable relative to each other along the moulding orientation S between a position where the first block 31 and the second block 32 are in contact and a position where they are spaced apart and where the second block 32 and the third block 33 are movable relative to each other along the moulding orientation S between a position where they are in contact and a position where they are spaced apart.

A1. The mould according to paragraph A, comprising a first spring 313, interposed between the first block 31 and the second block 32, and a second spring 323, interposed between the second block 32 and the third block 33.

A1.1. The mould according to paragraph A1, wherein the second spring is configured to apply a closing force FAL along the moulding orientation S to keep the second block 32 and the third block 33 spaced apart when no other forces are applied.

A1.2. The mould according to paragraph A1 or A1.1, wherein the first spring 313 is configured to apply a closing force FAV along the moulding orientation S to keep the second block 32 and the first block 31 in contact with each other when no other forces are applied.

A2. The mould according to paragraph A1, A1.1 or A1.2, wherein, relative to the moulding orientation S, the first block 31 is interposed between the male die element 2 and the second block 32, and the second block 32 is interposed between the first block 31 and the third block 33.

A3. The mould according to any one of paragraphs A to A2. comprising a first cooling circuit 25, configured to cool the male die element 2.

A4. The mould according to any one of paragraphs A to A3. comprising a second cooling circuit 34, configured to cool the female die element 3.

A4.1. The mould according to paragraph A4, wherein the second cooling circuit 34 comprises a recirculation duct 34' configured to traverse the first block 31, the second block 32 and the third block 33.

A4.1.1. The mould according to paragraph A4.1, wherein the second cooling circuit 34 comprises:
- a first internal duct 341, defining a respective cooling path inside the first block 31;
- a second internal duct 342, defining a respective cooling path inside the second block 32;
- a third internal duct 343, defining a respective cooling path inside the third block 33.

A4.1.1.1. The mould according to paragraph A4.1.1, wherein the first internal duct 341, the second internal duct 342 and the third internal duct 343 are connected to each other in series.

A4.1.1.2. The mould according to paragraph A4.1.1, wherein the first internal duct 341, the second internal duct 342 and the third internal duct 343 are connected to each other in parallel.

A5. The mould according to any one of paragraphs A to A4.1.1.2, wherein the male die element 2 includes an annular body at one end of the male die element 2, facing the female die element 3 and centrally defining a slide cavity 244.

A5.1. The mould according to paragraph A5, wherein the male die element 2 includes a central block 24, movable in the slide cavity 244 along the moulding orientation S, between a moulding position, where it is retracted relative to the female die element 3, and a releasing position, where it is extended towards the female die element 3.

A5.1.1. The mould according to paragraph A5.1, wherein the male die element 2 includes a pressurizing duct 243, connected to the slide cavity 244 and configured to inject air into the slide cavity 244.

A5.1.1.1. The mould according to paragraph A5.1.1, wherein the annular body comprises a toothed bush 22 and a receiving bush 23, spaced apart by a flow gap.

A5.1.1.1.1. The mould according to paragraph A5.1.1.1, wherein the annular body comprises at least one communication passage which is open onto the flow gap and onto the pressurizing duct 243 to place them in fluid communication.

A6. The mould according to any one of paragraphs from A to A5.1.1.1.1, wherein the male die element 2 comprises an outer bush 21 that is movable relative to the annular body along the moulding orientation S.

B. A compression moulding machine 1 for making a closure 100 (preferably of plastic material) with a tear-off membrane, comprising:
- a frame 1';
- a rotary carousel 10 configured to rotate about a first axis of rotation R1 and including a first platen 10A and a second platen 10B;
- a plurality of moulds 11, each including a male die element 2, associated with the first platen 10A, and a female die element 3, associated with the second platen 10B; each mould 11 being positionable between a closed configuration, in which the male die element 2 and the female die element 3 are in contact with each other, and an open configuration, in which the male die element 2 and the female die element 3 are spaced apart;
- an actuating unit 12, configured to rotate the rotary carousel and to move each female die element 3 relative to the corresponding first portion 2 along a moulding orientation S;
- a feeder, configured to provide a charge of material to be moulded;
- an auxiliary unit 14, configured to feed the charge to each mould 11 of the plurality of moulds, configured to withdraw the closure from each mould 11 of the plurality of moulds 11 and configured to convey the closure 100 to a storage zone, wherein each mould 11 of the plurality of moulds is a mould 11 according to any one of paragraphs from A to A6.

B1. The machine according to paragraph B, comprising:
a first working station SL1, in which the auxiliary unit is configured to feed the charge of material to each mould 11;
a second working station SL2, in which the actuating unit 12 is configured to move each mould 11 from the open configuration to the closed configuration, the second working station SL2 being angularly spaced from the first working station SL1 by a closing angle AC;
a third working station SL3, in which the actuating unit 12 is configured to move each mould 11 from the closed configuration to the open configuration, the third working station SL3 being angularly spaced from the first working station SL1 by a reopening angle AA.

B1.1. The machine according to paragraph B1, wherein, in the first working station SL1, the auxiliary unit 14 is configured to withdraw the closure from each mould 11.

B1.2. The machine according to paragraph B1 or B1.1, comprising a compactor, configured to keep the first block 31, the second block 32 and the third block 33 of each mould 11 in contact with each other along the moulding orientation S.

B1.2.1. The machine according to paragraph B1.2, wherein the compactor is configured to keep the first block 31, the second block 32 and the third block 33 of each mould 11 in contact with each other along the moulding orientation S at positions of the mould 11 between the third working station SL3 and the second working station SL2.

B1.2.1.1. The machine according to paragraph B1.2.1 wherein the compactor is configured to keep the first block 31, the second block 32 and the third block 33 of each mould 11 in contact with each other in the first working station SL1.

B2. The machine according to any one of paragraphs from B to B1.2.1.1, wherein the third block 33 is connected to the actuating unit to move the entire female die element 3.

C. A method for making a closure 100 (preferably of plastic material) with a tear-off membrane, by compression moulding, comprising the following steps:
- preparing a mould 11, having a male die element 2 and a female die element 3, the female die element 3 including: a first block 31, a second block 32 and a third block 33, aligned with each other and movable along a moulding orientation S;
- feeding a charge of material to the mould 11;
- closing the mould 11 by moving the male die element 2 and the female die element 3 of the mould 11 closer together along the moulding orientation S;
- extruding the charge of material into an expansion chamber CE delimited by the walls of the male die element 2 and of the female die element 3;
- opening the mould 11 by moving the male die element 2 and the female die element 3 of the mould 11 away from each other along the moulding orientation S;
- withdrawing the closure 100 from the mould 11.

C1. The method according to paragraph C, wherein a first spring 313, interposed between the first block 31 and the second block 32, applies a first force along the moulding orientation S, between the first block 31 and the second block 32, and wherein a second spring 323, interposed between the second block 32 and the third block 33, applies a second force along the moulding orientation S, between the second block 32 and the third block 33.

C1.1. The method according to paragraph C1, wherein the first force is a closing force FAV along the moulding orientation S to keep the first block 31 and the second block 32 in contact with each other when no other forces are applied.

C1.2. The method according to paragraph C1 or C1.1, wherein the first force is an opening force FAL along the moulding orientation S to keep the second block 32 and the third block 33 spaced apart when no other forces are applied.

C1.3. The method according to any one of paragraphs C1 to C1.2, wherein the step of closing comprises a first step of closing in which, as the male die element 2 and the female die element 3 move closer together, the first block 31 and the second block 32 are in contact with each other under the effect of the first spring and the third block 33 is spaced from the second block 32 under the effect of the second spring 323.

C1.3.1. The method according to paragraph C1.3, wherein the step of closing comprises a second step of closing, in which, when the second block 32 comes into abutment against the male die element 2 along the moulding orientation S, the third block 33 continues moving until coming into contact with the second block 32.

C2. The method according to any one of paragraphs C to C1.3.1, wherein the step of opening comprises a first step of opening in which the third block 33 moves away from the second block 32 along the moulding orientation S.

C2.1. The method according to paragraph C2, wherein the step of opening comprises a second step of opening in which the second block 32 moves away from the first block 31 along the moulding orientation S while keeping constant its distance from the third block 33 along the moulding orientation S.

C2.1.1. The method according to paragraph C2.1, wherein the step of opening comprises a third step of opening in which the first block 31 moves away from the male die element 2 as one with the second block 32 and the third block 33.

C2.1.1.1 The method according to paragraph C2.1.1, wherein the first step of opening is performed before the second step of opening and the second step of opening is performed before the third step of opening.

C3. The method according to any one of paragraphs C to C2.1.1, comprising a first step of cooling, in which a first cooling circuit 25 of the mould 11 cools the male die element 2.

C4. The method according to any one of paragraphs C to C3, comprising a second step of cooling, in which a second cooling circuit 34 of the mould 11 cools the female die element 3.

C5. The method according to any one of paragraphs C to C4, wherein the step of releasing comprises a step of sliding a central block 24 of the male die element 2 along the moulding orientation S relative to a slide cavity 244 formed in an annular body of the male die element 2.

C4.1. The method according to paragraph C4, wherein the step of releasing comprises a step of sliding an outer bush 21 of the male die element 2 along the moulding orientation S relative to the annular body in order to release the closure 100.

C5. The method according to any one of paragraphs C to C4.1, comprising the following steps:
- preparing a rotary carousel 10 on which the mould 11 is mounted;
- performing the step of feeding the charge of material in a first working station SL1 by means of an auxiliary unit 14;
- rotating the rotary carousel 10;
- performing the step of closing the mould in a second working station SL2 of the rotary carousel 10 by means of an actuating unit 12;
- performing the step of opening the mould in a third working station SL3 of the rotary carousel 10 by means of the actuating unit 12;
- performing the step of withdrawing the closure 100 from the mould 11 in the first working station SL1 by means of the auxiliary unit 14.

C5.1. The method according to paragraph C5, comprising a step of compacting, in which a compactor reduces the height of the female die element 3 along the moulding orientation S.

C5.1.1. The method according to paragraph C5.1, wherein, in the step of compacting, the compactor keeps the second block 32 in contact with the third block 33 during the steps of feeding and withdrawing.

C6. The method according to any one of paragraphs C to C5.1.1, wherein, when the mould is closed, the second block and the first block are kept in contact with each other, when no other forces are applied.

C6.1. The method according to paragraph C6, wherein, when the mould is closed, the second block and the first block are kept in contact with each other by applying a closing force.

C6.1.1. The method according to paragraph C6.1, wherein closing force is provided by a first spring.

C6.1.1. The method according to paragraph C6.1.1, wherein the first spring applies the closing force along the moulding orientation.

The invention claimed is:

1. A mould for the production of closures of plastic material with a tear-off membrane, in a compression moulding machine, the mould comprising a male die element, including a first abutment surface, and a female die element, movable relative to each other along a moulding orientation, such that the mould is positionable between a closed configuration, in which the male die element and the female die element are in contact with each other, and an open configuration, in which the male die element and the female die element are spaced apart, wherein the female die element includes:
- a first block, a second block and a third block, aligned with each other and movable relative to each other along the moulding orientation;
- a first spring, interposed between the first block and the second block;
- a second spring, interposed between the second block and the third block and configured to apply an opening force along the moulding orientation to keep the second block and the third block spaced apart when no other forces are applied, wherein the first spring is configured to apply a closing force along the moulding orientation to keep the second block and the first block in contact with each other when no other forces are applied.

2. The mould according to claim 1, wherein, relative to the moulding orientation, the first block is interposed between the male die element and the second block, and the second block is interposed between the first block and the third block.

3. The mould according to claim 2, comprising a first cooling circuit, configured to cool the male die element, and a second cooling circuit, configured to cool the female die element, in which the second cooling circuit comprises a recirculation duct configured to traverse the first block, the second block and the third block.

4. The mould according to claim 3, wherein the second cooling circuit comprises:
- a first internal duct, defining a respective cooling path inside the first block;
- a second internal duct, defining a respective cooling path inside the second block;
- a third internal duct, defining a respective cooling path inside the third block, wherein the first internal duct, the second internal duct and the third internal duct are connected to each other in series.

5. The mould according to claim 1, wherein the male die element includes:
- an annular body at one end of the male die element, facing the female die element and centrally defining a slide cavity;
- a central block, movable in the slide cavity along the moulding orientation, between a moulding position, where it is retracted relative to the female die element, and a releasing position, where it is extended towards the female die element.

6. The mould according to claim 5, wherein the male die element includes a pressurizing duct, connected to the slide cavity and configured to inject air into the slide cavity to facilitate extraction of the closure.

7. The mould according to claim 6, wherein the annular body comprises a toothed bush and a receiving bush, spaced apart by a flow gap and wherein the annular body comprises at least one communication passage which is open onto the flow gap and onto the pressurizing duct to allow the passage of air and/or water.

8. The mould according to claim 1, wherein the male die element comprises an outer bush that is movable relative to the annular body along the moulding orientation.

* * * * *